(12) United States Patent
Kwon

(10) Patent No.: US 9,953,615 B2
(45) Date of Patent: Apr. 24, 2018

(54) DISPLAY APPARATUS AND CONTROL METHOD THEREOF

(71) Applicant: SAMSUNG ELECTRONICS CO., LTD., Suwon-si (KR)

(72) Inventor: Oh-yun Kwon, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 15/085,249

(22) Filed: Mar. 30, 2016

(65) Prior Publication Data

US 2016/0293139 A1 Oct. 6, 2016

(30) Foreign Application Priority Data

Mar. 30, 2015 (KR) ........................ 10-2015-0044472

(51) Int. Cl.
  *G09G 5/02* (2006.01)
  *G09G 5/06* (2006.01)
  *G06F 3/03* (2006.01)
  *G09G 5/00* (2006.01)

(52) U.S. Cl.
  CPC ................ *G09G 5/02* (2013.01); *G06F 3/03* (2013.01); *G09G 5/00* (2013.01); *G09G 5/06* (2013.01); *G09G 2320/062* (2013.01); *G09G 2320/066* (2013.01); *G09G 2320/0646* (2013.01); *G09G 2320/0666* (2013.01); *G09G 2320/08* (2013.01); *G09G 2354/00* (2013.01); *G09G 2360/144* (2013.01)

(58) Field of Classification Search
  CPC .............. G09G 5/02; G09G 2320/062; G09G 2320/0646; G09G 2320/066; H04N 13/0033
  See application file for complete search history.

(56) References Cited

U.S. PATENT DOCUMENTS

| | | | | |
|---|---|---|---|---|
| 8,368,638 B2* | 2/2013 | Yun | ...................... | G09G 3/3406 345/102 |
| 8,390,674 B2* | 3/2013 | Kim | ................... | G06K 9/00604 345/419 |
| 2002/0186222 A1* | 12/2002 | Morton | ................. | G06F 9/4443 345/589 |

FOREIGN PATENT DOCUMENTS

| | | |
|---|---|---|
| JP | 2014-160170 A | 9/2014 |
| KR | 10-2014-0122982 A | 10/2014 |
| WO | 2013/186972 A1 | 12/2013 |

* cited by examiner

*Primary Examiner* — Antonio A Caschera
(74) *Attorney, Agent, or Firm* — Sughrue Mion, PLLC

(57) ABSTRACT

A display apparatus including: a display configured to display an image; and at least one processor configured to, in response to beginning a viewer fatigue reduction function, determine whether a change characteristic of an image displayed on the display during a first time interval of an image signal corresponds to a suitable section for the viewer fatigue reduction function, and control the display to decrease a viewing fatigue level of the displayed image during the determined suitable section.

19 Claims, 23 Drawing Sheets

DISPLAY APPARATUS AND CONTROL METHOD THEREOF

CROSS-REFERENCE TO RELATED APPLICATION

This application claims priority from Korean Patent Application No. 10-2015-0044472, filed on Mar. 30, 2015 in the Korean Intellectual Property Office, the disclosure of which is incorporated herein by reference in its entirety.

BACKGROUND

Field

Apparatuses and methods consistent with exemplary embodiments relate to a display apparatus and a control method thereof, and more particularly, to a display apparatus having a function of reducing blue light of an image and a control method thereof.

Description of the Related Art

A display apparatus, such as a television (TV), a monitor, etc., includes a light emitting diode (LED), or another light source, as a backlight for displaying an image. However, the LED, etc., emits more blue light than a fluorescent, incandescent or halogen lamp.

If a viewer's eyes are exposed to the blue light for a long time, it causes eye strain, dry eye syndrome, etc., or may damage a retina or a crystalline lens in the eye. That is, the blue light may be harmful to the human body. Further, if the display apparatus is used for a long time, the blue light decreases a secretion of sleep-inducing hormones in a viewer. Thus, a viewer's sleep pattern may be affected.

Methods have been attempted to reduce the emission of the blue light. Some methods include artificially lowering a gain of a blue light signal component emitted from a light source, or sticking a physical filter for blocking off the blue light signal component.

However, lowering the gain may be visually inconvenient for a user who continuously views a screen because picture quality is affected by decreased emission of the blue light. Further, the picture quality is uniformly changed regardless of the characteristics of a currently displayed image, whereas there are various contents of the displayed image. Therefore, it is difficult to provide a picture quality optimized to a user's working environment and also adapt to a change in an input image.

In addition, the physical filter uniformly blocks off the blue light regardless of the characteristics of an image. Therefore, it is difficult to provide a picture quality optimized to a user and also deal with a change in an input image.

SUMMARY

Exemplary embodiments address at least the above problems and/or disadvantages and other disadvantages not described above. Also, the exemplary embodiments are not required to overcome the disadvantages described above, and may not overcome any of the problems described above.

According to an aspect of an exemplary embodiment, there is provided a display apparatus including: a display configured to display an image; and at least one processor configured to, in response to beginning a viewer fatigue reduction function, determine whether a change characteristic of an image displayed on the display during a first time interval corresponds to a suitable time interval for the viewer fatigue reduction function, and control the display to decrease a viewing fatigue level of the displayed image during the determined suitable time interval. Thus, it is possible to perform adaptive control according to activities of the image, and thus avoiding sudden change in picture quality while reducing the viewing fatigue level.

The processor may be further configured to decrease the viewing fatigue level by adjusting at least one attribute value of the displayed image during the suitable time interval. Thus, attribute values are adjusted in a time interval where it is difficult to recognize change in picture quality, thereby minimizing a user's visual inconvenience.

The viewing fatigue level may include an emission amount of blue light, and the attribute of the image may include at least one among a contrast ratio, a color temperature, and brightness of the image. Thus, it is possible to prevent long-time exposure to blue light that is harmful to a user's body.

The processor may be further configured to determine a category of the displayed image, and determine a change range of a contrast ratio due to a decrease in the viewing fatigue level according to the determined category of the image. Thus, efficient control is possible since change range automatically optimized to contents is applied.

The category of the image may include a moving image and a still image, and a change range of a contrast ratio of the moving image may be larger than a change range of a contrast ratio of the still image. Thus, it is possible to decrease a user's inconvenience due to sudden change in picture quality in case of a still image having little change.

The processor may be further configured to, in response to detecting a change in the category of the displayed image, decrease the viewing fatigue level within a change range of a contrast ratio corresponding to the changed category. Thus, it is possible to adaptively cope with the image changed from moment to moment.

The display apparatus may further include a memory configured to store a lookup table with setting values of color temperature and brightness of an image corresponding to an operation time of the reduction function, wherein the processor may be further configured to load the color temperature and the brightness corresponding to the operation time of the viewer fatigue reduction function from the lookup table during the suitable time interval, and control the display to apply the loaded color temperature and the brightness to the displayed image. Thus, the performance of the reduction function becomes higher since the optimized attribute values are applied at the optimized timing.

The memory may be further configured to store a color temperature table in which a gain value of a red/green/blue (RGB) signal corresponding to the setting value of the color temperature may be stored, wherein the processor may be further configured to load a gain value of the RGB signal corresponding to the loaded color temperature from the color temperature table and control the display to apply the color temperature corresponding to the operation time of the suitable time interval based on the loaded gain value of the RGB signal to the displayed image. Thus, red and green light are also controlled as well as blue light, thereby efficiently performing the image control.

The change characteristic of the image may include a change range of an average picture level in brightness of the image, wherein the processor may be further configured to detect the average picture level of the brightness of the image displayed in the first time interval and a change range of the average picture level, compare the change range of the detected average picture level with a threshold, and determine the first time interval as the suitable time interval according to a result of the comparison. Thus, the function of reducing the blue light is performed only when change in the image is higher than the threshold, and it is thus difficult for a user to recognize the change in the image.

The change characteristic of the image may include a regularity of a motion vector in the displayed image, wherein the processor may be further configured to detect information about horizontal/vertical (H/V) motion vector of the displayed image during the first time interval, and determine the first time interval as the suitable time interval according to the regularity of the detected H/V motion vector. Thus, the function of reducing the blue light is adaptively performed even in the contents having regular properties like a web page.

The processor may be further configured to, in response to beginning the viewer fatigue reduction function, perform an instant level decrease for immediately decreasing the viewing fatigue level of the displayed image by a first decrement, and perform a gradual level decrease for gradually decreasing the viewing fatigue level by a second decrement during a predetermined time interval, after the instant level decrease, wherein the gradual level decrease may be controlled to decrease the viewing fatigue level during the determined suitable time interval in accordance with the change characteristic of the image. Thus, a certain amount of blue light is decreased together with the beginning of the function, thereby improving efficiency.

The processor may be further configured to, in response to an attribute value of the displayed image reaching a target value or a preset operation time elapsing, terminate the viewer fatigue reduction function, wherein the target value may correspond to a category of the displayed image. Thus, it is possible to decrease device load caused as a certain function is continued, and prevent picture quality from being excessively degraded.

The display apparatus may further include a user interface configured to receive a user input for beginning the viewer fatigue reduction function, wherein the user interface may include at least one of a hotkey and an on screen display (OSD), and wherein the hotkey may be provided in at least one among a main body of the display apparatus, an input device separate from the main body, and a host apparatus configured to connect with the main body. Thus, the blue light reduction function is easily performed by a user's various selections.

According to an aspect of another exemplary embodiment, there is provided a display apparatus including: a display configured to display an image; and at least one processor configured to, in response to beginning a viewer fatigue reduction function, perform an instant level decrease for immediately decreasing a viewing fatigue level of the displayed image by a first decrement and perform a gradual level decrease for gradually decreasing the viewing fatigue level by a second decrement during a predetermined time interval, after the instant level decrease. Thus, the viewing fatigue level is decreased by a certain level along with the beginning of the function, thereby improving efficiency and minimizing a user's visual inconvenience through the following gradual level decrease.

The processor may be further configured to determine whether a change characteristic of an image displayed on the display during a first time interval of an image signal corresponds to a suitable time interval for a viewer fatigue reduction function, and control the display to decrease the viewing fatigue level of the displayed image during the determined suitable time interval. Thus, it is possible to provide an adaptive control function according to activities of the image.

According to an aspect of another exemplary embodiment, there is provided a method of controlling a display apparatus, the method including: detecting a change characteristic of an image displayed on a display during a first time interval of an image signal in response to beginning a viewer fatigue reduction function; determining whether the first time interval corresponds to a suitable time interval for a viewer fatigue reduction function based on the detected change characteristic; and controlling the displayed image to decrease a viewing fatigue level of the displayed image during the determined suitable time interval. Thus, it is possible to perform adaptive control according to activities of the image, and thus avoiding sudden change in picture quality while reducing the viewing fatigue level.

The controlling the image may include decreasing the viewing fatigue level by adjusting at least one attribute value of the displayed image during the suitable time interval. Thus, attribute values are adjusted in a time interval where it is difficult to recognize change in picture quality, thereby minimizing a user's visual inconvenience.

The viewing fatigue level may include an emission amount of blue light, and the attribute of the image may include at least one among a contrast ratio, a color temperature and brightness of the image. Thus, it is possible to prevent long-time exposure to blue light that is harmful to a user's body.

The method may further include determining a category of the displayed image, wherein a change range of a contrast ratio due to decrease in the viewing fatigue level may be determined according to the determined category of the image. Thus, efficient control is possible since change range automatically optimized to contents is applied.

The category of the image may include a moving image and a still image, and a change range of a contrast ratio of the moving image may be larger than a change range of a contrast ratio of the still image. Thus, it is possible to decrease a user's inconvenience due to sudden change in picture quality in case of a still image having little change.

The method may further include detecting a change in the category of the displayed image, and decreasing the viewing fatigue level within a change range of a contrast ratio corresponding to the changed category. Thus, it is possible to adaptively cope with the image changed from moment to moment.

The method may further include storing a lookup table with setting values of color temperature and brightness of an image corresponding to an operation time of the viewer fatigue reduction function, and wherein the controlling the image may include loading the color temperature and the brightness corresponding to the operation time of the reduction function from the lookup table during the suitable time interval, and controlling the display to apply the loaded color temperature and brightness to the displayed image. Thus, the performance of the reduction function becomes higher since the optimized attribute values are applied at the optimized timing.

The method may further include storing a color temperature table in which a gain value of a red/green/blue (RGB) signal corresponding to the setting value of the color temperature may be stored, and wherein the controlling the image may further include loading a gain value of the RGB signal corresponding to the loaded color temperature from the color temperature table and controlling the display to apply the color temperature corresponding to the operation time of the suitable time interval based on the loaded gain value of the RGB signal to the displayed image. Thus, red and green light are also controlled as well as blue light, thereby efficiently performing the image control.

The change characteristic of the image may include a change range of an average picture level in brightness of the image, and wherein the determining the suitable time interval may include detecting the average picture level of the brightness of the image displayed in the first time interval and a change range of the average picture level, comparing the change range of the detected average picture level with a threshold, and determining the first time interval as the suitable time interval according to a result of the comparison. Thus, the function of reducing the blue light is performed only when change in the image is higher than the threshold, and it is thus difficult for a user to recognize the change in the image.

The change characteristic of the image may include a regularity of a motion vector in the displayed image, and the determining the suitable time interval may include detecting information about horizontal/vertical (H/V) motion vector of the displayed image during the first time interval, and determining the first time interval as the suitable time interval according to the regularity of the detected H/V motion vector. Thus, the function of reducing the blue light is adaptively performed even in the contents having regular properties like a web page.

The method may further include performing an instant level decrease for immediately decreasing the viewing fatigue level of the displayed image by a first decrement in response to beginning the reduction function, wherein the controlling the image may include performing a gradual level decrease for gradually decreasing the viewing fatigue level by a second decrement during a predetermined time interval, after the instant level decrease, and decreasing the viewing fatigue level during the determined suitable time interval in accordance with the change characteristic of the image. Thus, a certain amount of blue light is decreased together with the beginning of the function, thereby improving efficiency.

The method may further include terminating the viewer fatigue reduction function for the viewing fatigue level in response to an attribute value of the displayed image reaching a target value or a preset operation time elapsing, wherein the target value corresponds to a category of the displayed image. Thus, it is possible to decrease device load caused as a certain function is continued, and prevent picture quality from being excessively degraded.

The method may further include receiving a user input for beginning the viewer fatigue reduction function, wherein the user interface may include at least one of a hotkey and an on screen display (OSD), and wherein the hotkey may be provided in at least one among a main body of the display apparatus, an input device separated from the main body, and a host apparatus connectable with the main body. Thus, the blue light reduction function is easily performed by a user's various selections.

According to an aspect of another exemplary embodiment, there is provided a control method of a display apparatus, the method including: performing an instant level decrease for immediately decreasing a viewing fatigue level of an image by a first decrement in response to beginning a viewer fatigue reduction function; and performing a gradual level decrease for gradually decreasing the viewing fatigue level by second decrement during a predetermined time interval, after the instant level decrease. Thus, the viewing fatigue level is decreased by a certain level along with the beginning of the function, thereby improving efficiency and minimizing a user's visual inconvenience through the following gradual level decrease.

The performing the gradual level decrease may include: determining whether a change characteristic of the image displayed on a display during a first time interval of an image signal corresponds to a suitable time interval for the viewer fatigue reduction function; and performing the gradual level decrease to decrease the viewing fatigue level of the displayed image during the determined suitable time interval. Thus, it is possible to provide an adaptive control function according to activities of the image.

BRIEF DESCRIPTION OF THE DRAWINGS

The above and/or other aspects will be more apparent by describing exemplary embodiments with reference to the accompanying drawings, in which.

DETAILED DESCRIPTION OF EXEMPLARY EMBODIMENTS

Figure 1:
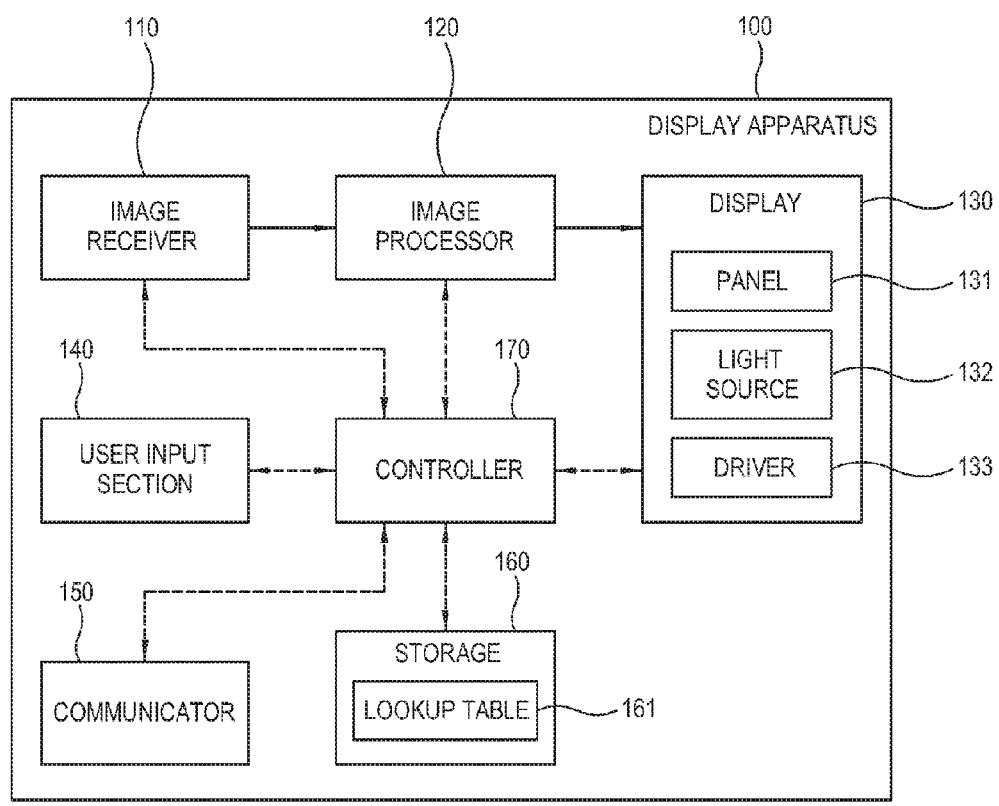
FIG. 1 is a block diagram of a display apparatus, according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail if they would obscure the description with unnecessary detail.

FIG. 1 is a block diagram of a display apparatus 100, according to an exemplary embodiment.

As shown in FIG. 1, the display apparatus 100 processes an image signal (e.g., an input signal) provided from an external image source in accordance with a preset process and displays it as an image on a display 130.

According to an exemplary embodiment, the display apparatus 100 may be achieved by a monitor that receives an image signal from a main body of a computer (e.g., a personal computer) or a television (TV) that displays a broadcast image based on a broadcast signal/broadcast information/broadcast data received from a transmitter of a TV broadcasting station. However, the image displayed by the display apparatus 100 is not limited to a broadcast image. For example, the display apparatus 100 may display a moving image based on a signal/data received from various image sources, a still image, an application, an on-screen display (OSD), a user interface (UI, hereinafter also referred to as a graphic user interface (GUI)) for controlling various operations, etc.

According to an exemplary embodiment, the display apparatus 100 may be achieved by at least one of a digital signage, a large format display, and a large-sized display apparatus.

According to an exemplary embodiment, the display apparatus 100 may be achieved by a smart TV or an Internet protocol (IP) TV. The smart TV is capable of receiving and displaying a broadcast signal in real time, and has a web-browsing function for searching and consuming various contents through Internet while displaying the broadcast signal in real time. To this end, the smart TV offers a convenient environment to a user. Further, the smart TV has an open software platform and thus provides interactive services to a user. The smart TV can offer various contents, for example, an application of providing a predetermined service to a user through the open software platform. Such an application is an application program capable of providing various kinds of service, which may include applications for providing social network services (SNS), finance, news, weather, maps, music, movies, games, electronic books, etc.

Below, details of an exemplary embodiment of the display apparatus 100 are described.

As shown in FIG. 1, the display apparatus 100 includes an image receiver 110 that receives an image signal, an image processor 120 that processes an image signal received in the image receiver 110, a display 130 that displays an image based on the image signal processed by the image processor 120, a user input section 140 (e.g., user input interface) that receives a user's input, a communicator 150 that communicates with the exterior, a storage 160 (e.g., memory) that stores data, and a controller 170 that controls the display apparatus 100.

The image receiver 110 receives an image signal and transmits it to the image processor 120. The image receiver 110 may be variously achieved in accordance with the formats of an image signal and the types of the display apparatus 100. For example, the image receiver 110 may wirelessly receive a radio frequency (RF) signal from a broadcasting station, or may receive an image signal based on composite video, component video, super video, Syndicat des Constructeurs d'Appareils Radiorécepteurs et Télévi-seurs (SCART), high definition multimedia interface (HDMI), etc., through a wire or a cable. If an image signal is a broadcast signal, the image receiver 110 includes a tuner to be tuned to a channel for receiving a broadcast signal.

The image signal may be received from the external device such as a personal computer (PC), an audio/video (AV) device, a smart phone, a smart pad, etc. The image signal may be based on data received through the Internet etc. The display apparatus 100 may perform network communication through the communicator 150, or may further include a separate network communicator. The image signal may be based on data stored in a flash memory, a hard disk, or other nonvolatile storage 160. The storage 160 may be internally or externally provided in the display apparatus 100. If the storage 160 is externally provided, there may be a connector provided to which the storage 160 is connected.

The image processor 120 performs various image processing processes previously set with respect to the image signal. The image processor 120 outputs the processed image signal to the display 130 so that the display 130 can display the image.

The image processing may include decoding corresponding to various image formats, de-interlacing, frame refresh rate conversion, scaling, noise reduction for improving picture quality, detail enhancement, line scanning, etc. The image processor 120 may be achieved by an individual group for independently performing each of the processes, or may be achieved by a system-on-chip (SoC) in which various functions corresponding to such processes are integrated. For example, the display apparatus 100 may include a built-in processor 120 achieved by a video processing board having circuit elements such as various chipsets, a memory, etc., to perform such an image processing process.

According to an exemplary embodiment, the image processing process refers to an input image signal being properly processed through the image processor 120 or the controller 170, and includes an analog signal process and a digital signal process. For convenience of description, the following image processing process refers to a digital image process, but exemplary embodiments are not limited to this. Further, according to an exemplary embodiment, the image processing process may include at least one of a point process, an area process, a geometric process and a frame process. The point process is a process in units of pixels based on a position of a pixel. The area process changes a pixel value based on an original value of a pixel and a value of a neighboring pixel. The geometric process changes positions and arrangement of pixels. The frame process changes pixel values based on operation between two or more images. In the description below, the image processing process is the point process, unless otherwise indicated.

The display 130 displays an image based on an image signal processed by the image processor 120. Here, the displayed image may include blue light, i.e., a blue light component corresponding to a predetermined viewing fatigue level.

The display 130 may, for example, be achieved by liquid crystal, plasma, a light emitting diode (LED), an organic light-emitting diode (OLED), a surface-conduction electron-emitter, a carbon nano-tube (CNT), nano-crystal, but is not limited to these.

The display 130 may include additional elements in accordance with its type.

In the display apparatus 100 according to an exemplary embodiment, the display 130 includes a panel 131 for displaying an image, and a light source 132 (e.g., backlight) emitting light to the panel 131 as shown in FIG. 1, in which the light source 132 may be an LED. The display 130 may further include a driver 133 for driving the panel 131 and the light source 132.

The light source 132 may be at least one of an edge-type arranged at one or more edges of the panel 131, and a direct-type arranged at the back of the panel 131. The driver 133 is an example of a light source driver, and may be achieved as an independent printed circuit board (PCB) provided with at least one circuit element. Alternatively, the light source 132 and the driver 133 may be formed as a single device. The driver 133 may control an electric current flowing in the light source 132 so that the light source 132 can emit light with a desired amount.

According to an exemplary embodiment, the display 130 is achieved using LED, including the panel 131, the light source 132 as an LED backlight, and the driver 133 as an LED driver. However, exemplary embodiments are not limited to this. For example, the light source 132 may be achieved with an LCD backlight.

Further, the panel 131 may include a light emission cell of an OLED. If the panel 131 is achieved using OLED, the driver 133 may control an electric current flowing in each light emission cell so that the light emission cell in the panel 131 can emit light with a desired amount.

According to an exemplary embodiment, the display 130 may display a user interface (UI) or an on-screen display (OSD) including a menu item of the display apparatus 100. A user may input his/her selection by operating an input device 400 such as a remote controller, a keyboard, a mouse, etc., while viewing the user interface displayed on the display 130.

The user input section 140 transmits a preset various control command or limitless information to the controller 170 in response to a user's operation and/or input.

According to an exemplary embodiment, the user input section 140 may include a keypad (or an input panel) having numeral keys, menu keys, function keys, etc., provided in the main body of the display apparatus 100. The user input section 140 may include an input device 400, separated from the main body, such as a mouse, a keyboard, a remote controller, etc., to generate a preset command/data/information/signal previously set to remotely control the TV or monitor and transmit it to the display apparatus 100. The remote controller may include a touch sensor for sensing a user's touch input and/or a motion sensor for sensing its own motion by a user.

The input device 400 is an external device to perform wired or wireless communication with the main body of the display apparatus 100, in which the wireless communication includes at least one of Bluetooth, infrared communication, radio frequency (RF) communication, wireless local area network (WLAN), Wi-Fi direct, etc. If the input device 400 is a keyboard or mouse, the input device 400 may be connected to the display apparatus 100 by a wire or wirelessly.

The input device 400 is operated by a user and transmits a preset command to the display apparatus 100.

The keypad may include physical keypads formed in at least one of a front surface 101 (FIG. 2), lateral sides 102 (FIG. 2) and/or a rear surface 103 (FIG. 3) of the display apparatus 100, a virtual keypad displayed as a UI in the display 130, and a physical keypad (e.g., a keyboard) connectable by a wire or wirelessly. The physical keypad formed in the front surface 101, the lateral surface 102 and/or the rear surface 103 of the display apparatus 100 may include a touch button operated by a user's touch.

It will be appreciated by a person having ordinary skill in the art that the physical keypad or its buttons may be added or excluded in accordance with performance or structure of the display apparatus 100.

According to an exemplary embodiment, the user input section 140 may be provided in at least one of the main body of the display apparatus 100, the input device 400 separated from the main body, and the host apparatus connectable with the main body, and may include hotkeys 203, 303 and 403 corresponding to a function of reducing a predetermined viewing fatigue level, i.e., a function of reducing the blue light. The host apparatus may, for example, be connected to a computer (PC) connecting with a monitor if the display apparatus 100 is the monitor.

The reduction function for the viewing fatigue level described above reduces emission of the blue light of a predetermined fatigue level, which may cause eye strain, dry eye syndrome, sleep disturbance, etc., when eyes are exposed to the blue light for a long time. According to an exemplary embodiment, the display apparatus 100 supports an eye saver mode or an eye protection mode as an operation mode for performing the reduction function of the viewing fatigue level.

According to an exemplary embodiment, the display apparatus 100 sets the eye saver mode to be 'enabled', blue light having a wavelength of about 400 nm, i.e., a blue light level, is gradually reduced and optimum picture quality of relieving eye strain is provided after a setting time (for example, about 1 hour). Here, the provided picture quality satisfies standards of "Low Blue Light Content" because the blue light level is lower than the setting value.

Figure 2:
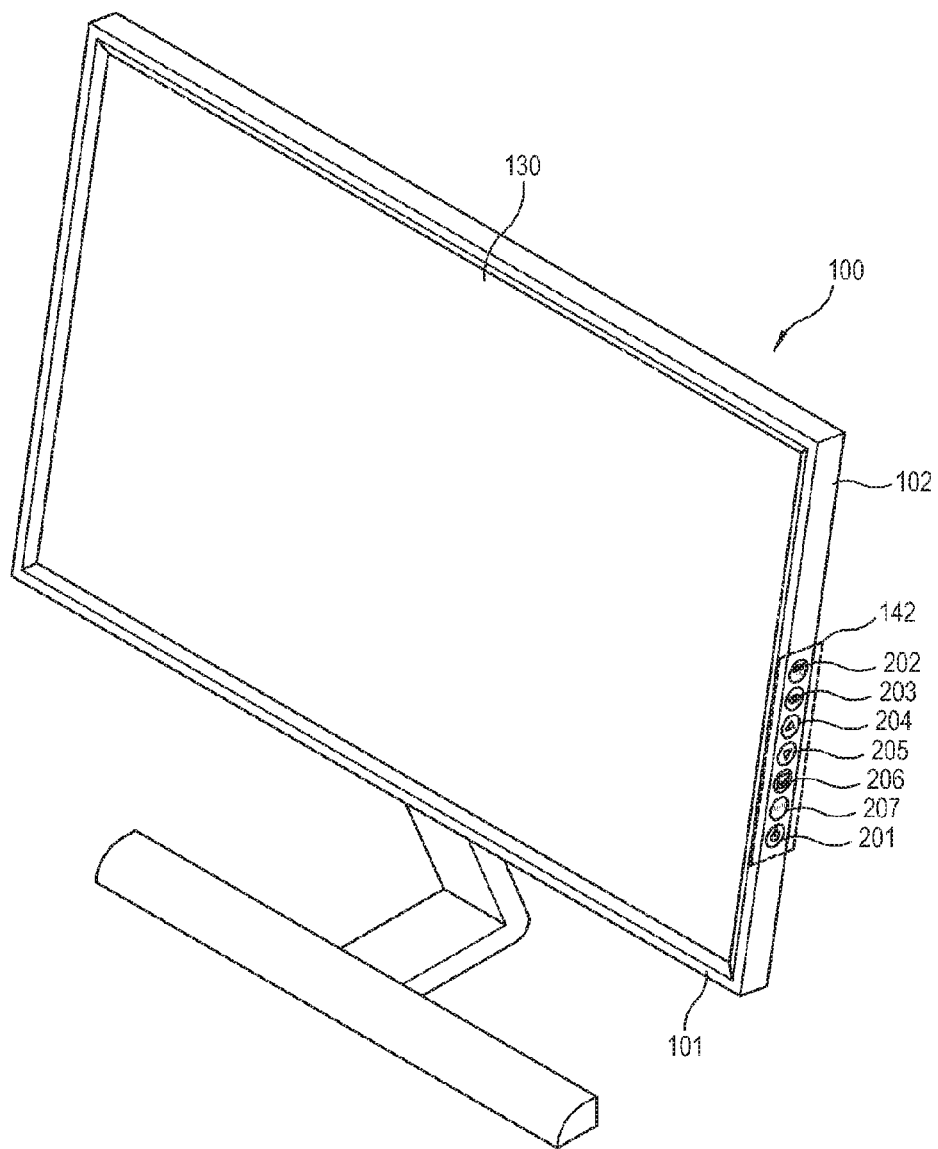
FIGS. 2 and 3 illustrate hotkeys corresponding to an eye saver mode in a main body of the display apparatus, according to an exemplary embodiment.
Figure 3:
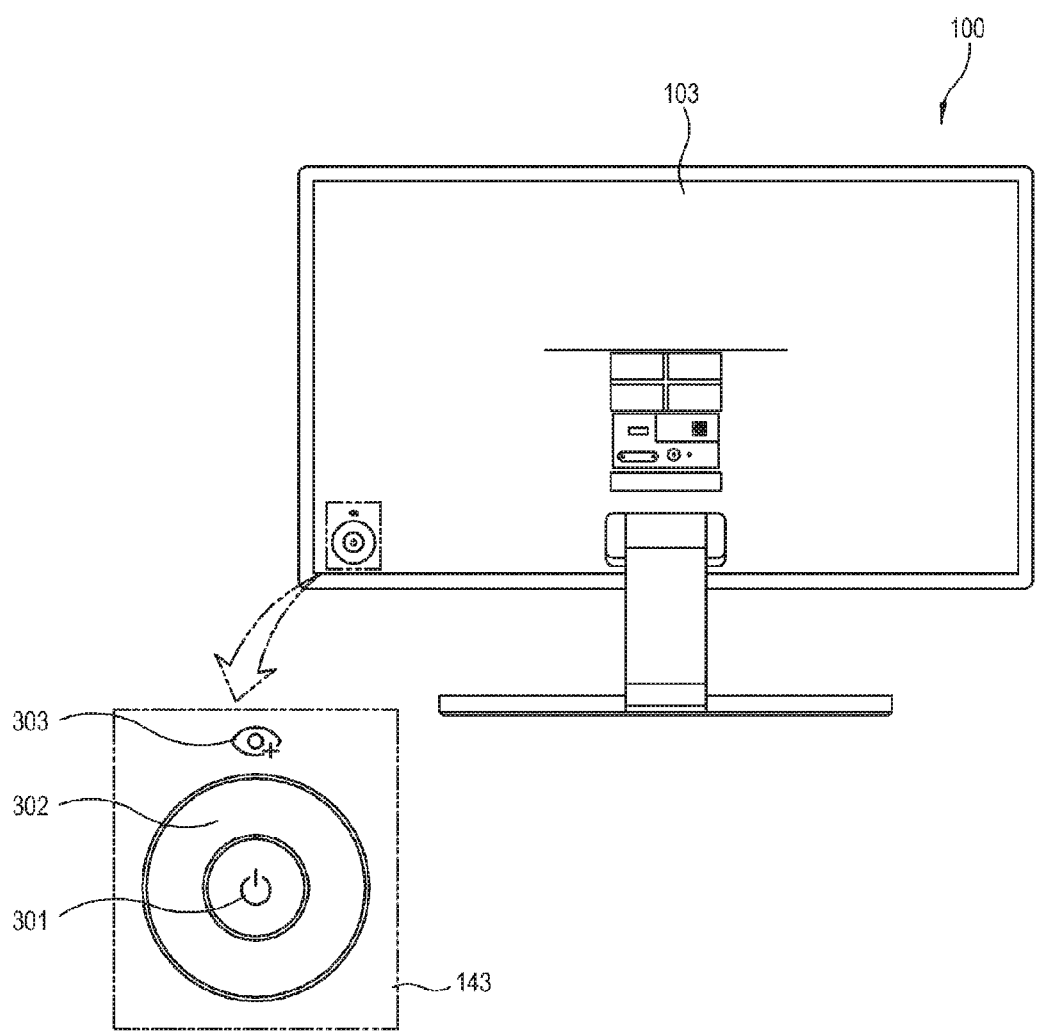
Figure 4:
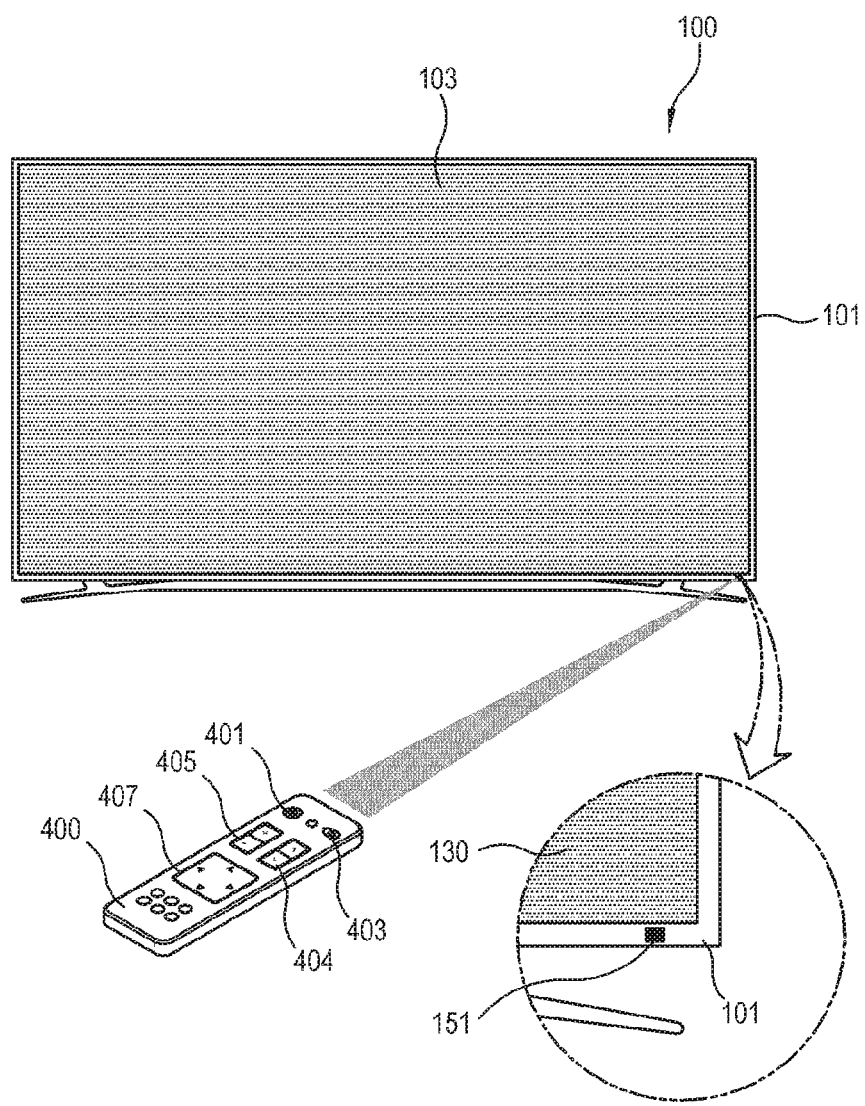
FIG. 4 illustrates hotkeys corresponding to the eye saver mode in an input device, according to an exemplary embodiment.

FIG. 2 and FIG. 3 illustrate hotkeys 203, 303 corresponding to an eye saver mode that are provided in a main body of the display apparatus 100, according to an exemplary embodiment, and FIG. 4 illustrates that a hotkey 403 corresponding to the eye saver mode is provided in an input device 400 separated from the main body.

As shown in FIG. 2, the display apparatus 100 may include a keypad 142 as the user input section 140 in a main body lateral surface 102. The lateral surface keypad 142 may include a power button 201, a menu button 202, arrow keys 204 and 205, an enter button 206 (or a push button), and an auto adjustment button 207, and may further include a hotkey 203 corresponding to the eye saver mode.

A user may enable the eye saver mode in the display apparatus 100 by pushing the corresponding hotkey 203.

As shown in FIG. 3, according to an exemplary embodiment, the display apparatus 100 may include a keypad 143 on the main body rear surface 103. The rear surface keypad 143 includes a jog button 302 selectable respectively corresponding to up, down, left and right directions, and an enter button 301. The enter button 301 may serve as a power button when the display apparatus 100 is in a power off state.

According to an exemplary embodiment, the rear surface keypad 143 may further include a hotkey 303 for enabling the eye saver mode in response to a user's selection. A user may push the hotkey 303 to enable the eye saver mode.

In FIG. 2 and FIG. 3, a separate button corresponding to the eye saver mode is provided as the hotkey, but exemplary embodiments are not limited thereto. Alternatively, another key may be used to perform a shortcut button function for the eye saver mode. For example, a user may press the enter button 206, 301, or another button twice in succession, or press it for a predetermined time, to enter the eye saver mode.

According to an exemplary embodiment, the display apparatus 100 may include one of the lateral surface keypad 142 and the rear surface keypad 143. Its position is not limited to those shown in FIG. 2 and FIG. 3. For example, a keypad with one or more buttons may be provided in the front surface 101 of the display apparatus 100.

FIG. 4 illustrates an example in which the input device 400 is a remote controller of the TV.

As shown in FIG. 4, according to an exemplary embodiment, the input device 400 provided as the user input section 140 includes a keypad having a power button 401, a channel button 404, and a volume button 405, and the keypad may further include a hot key 403 corresponding to the eye saver mode. The input device 400 may further include a touch sensor 407 for receiving a user's touch input.

A user presses the hotkey 403 of the input device 400 to make the display apparatus 100 enter the eye saver mode. A corresponding command is transmitted to the main body of the display apparatus 100 through an internal communication module (e.g., infrared communication, Bluetooth communication, etc.).

The front surface 101 of the display apparatus 100 may include a light window 151 to receive light (e.g., ultraviolet, visible, or infrared rays) from the input device 400. The display apparatus 100 receives a command for the eye saver mode from the input device 400 through the light window 151 or another wireless communication module (e.g., a Bluetooth module).

According to an exemplary embodiment, the light window 151 may output light from the inside of the display apparatus 100 (e.g., light emitted from a light emitting device) corresponding to the operation state of the display apparatus 100 to the outside of the display apparatus 100, thereby serving as a power indicator, etc.

FIG. 4 illustrates an example in which the TV remote controller used as the input device 400 includes the keypad having the hotkey 403. A keyboard, a mouse, etc., may include the hotkey for the eye saver mode.

According to an exemplary embodiment, the display apparatus 100 may not include a separate hotkey corresponding to the eye saver mode. In this case, a user may select a corresponding item in an OSD menu displayed on the display 130 to switch over to the eye saver mode.

FIGS. 5 to 10 illustrate screens for selecting and setting the eye saver mode through an on screen display (OSD) menu in the display apparatus 100 according to an exemplary embodiment.

Figure 5:
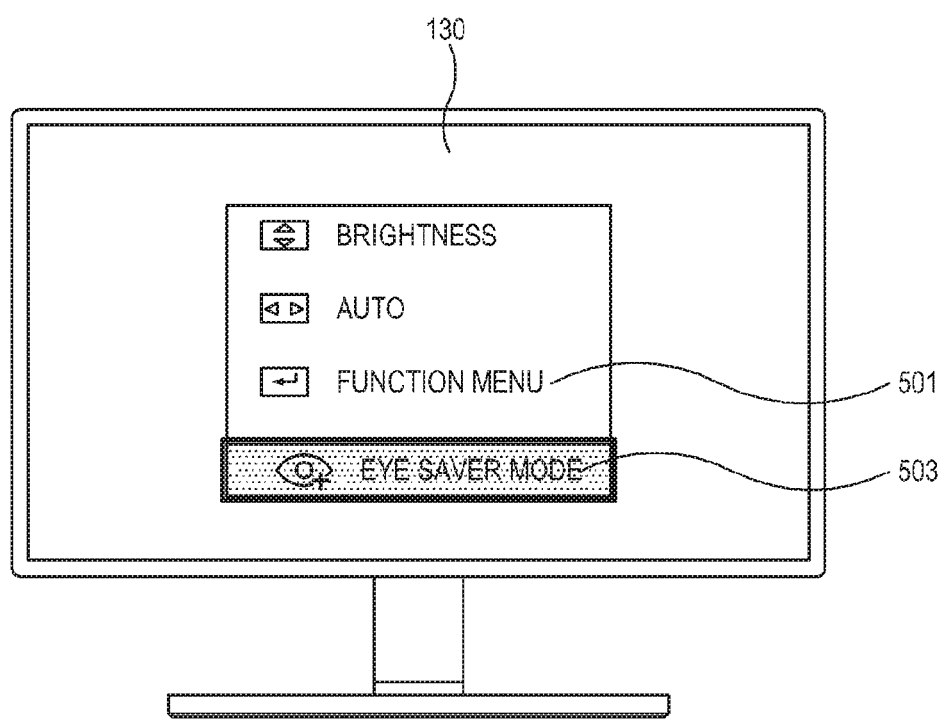
FIGS. 5 to 10 illustrate screens for selecting and/or setting the eye saver mode through an on screen display (OSD) menu in the display apparatus, according to an exemplary embodiment.

FIG. 5 illustrates an exemplary embodiment of using a shortcut button screen, in which a user may select the eye saver mode on the shortcut button screen.

For example, if a user presses a power button 201, 301 while the display apparatus 100 is being turned on, the display 130 may display a shortcut screen as shown in FIG. 5.

A user may select an item 503 corresponding to the eye saver mode through the arrow keys 204, 205, the jog button 302 provided in the main body of the display apparatus 100, or the input device 400. Here, the eye saver mode item 503 is provided as a virtual shortcut button (e.g., shortcut key) for the corresponding function.

FIG. 5 illustrates an example in which a separate item 503 is provided corresponding to the eye saver mode in the shortcut screen, but exemplary embodiments are not limited thereto. Alternatively, the shortcut screen may not include the eye saver mode item 503, and a user may use the existing menu item to switch over to the eye saver mode.

Figure 6:
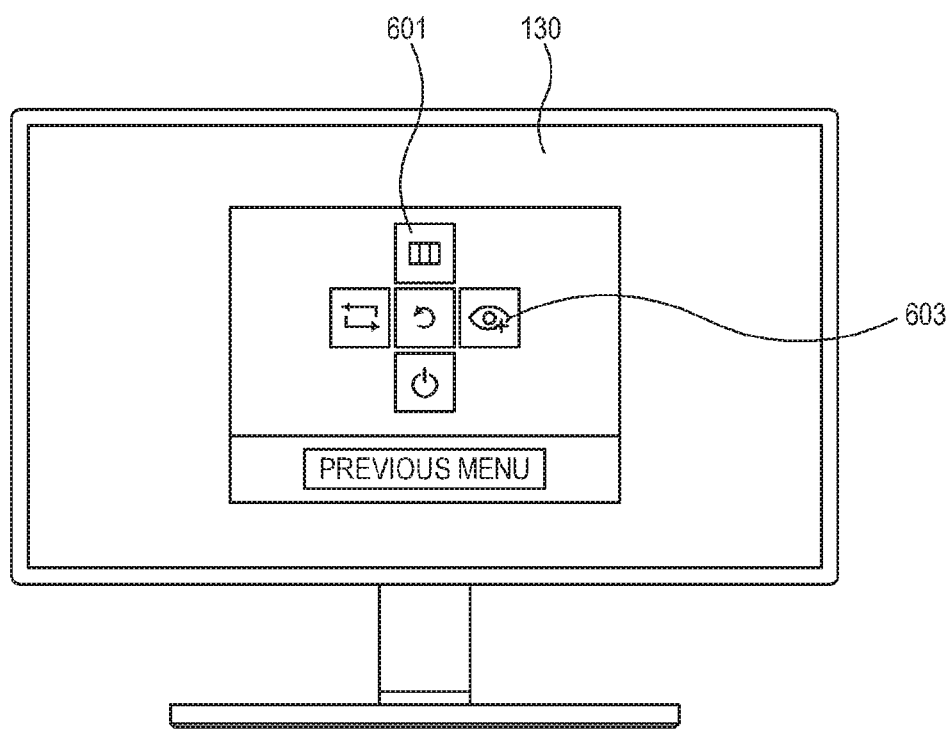

FIG. 6 illustrates an exemplary embodiment using a function button screen, in which the function button screen includes a virtual button 603 corresponding to the eye saver mode.

If a user selects the menu button 202 provided in the main body of the display apparatus 100, presses the jog button 302 while the display apparatus 100 is being turned on, or selects a function menu item 501 in the state that the shortcut screen is displayed as shown in FIG. 5, the display 130 may display the function button screen as shown in FIG. 6. Here, an eye saver mode item 603 may be provided as a virtual shortcut button (e.g., shortcut key) for the corresponding function.

A user may use the arrow keys 204, 205 or the jog button 302 provided in the main body of the display apparatus 100, or the input device 400 to select the item 603 corresponding to the eye saver mode.

Figure 7:
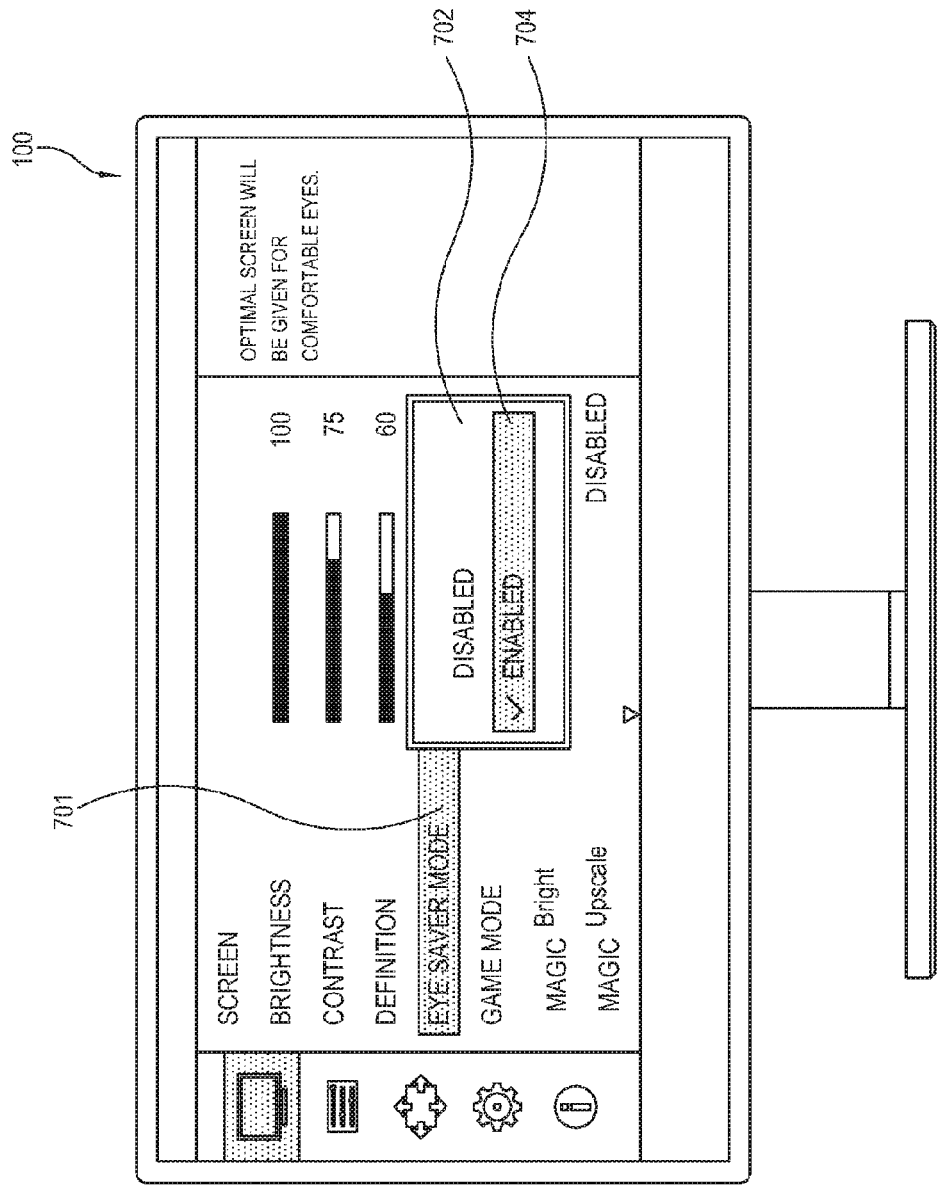

FIG. 7 illustrates a screen for enabling/disabling the eye saver mode, according to an exemplary embodiment.

If the eye saver mode item 503, 603 is selected in FIG. 5 or FIG. 6, the display 130 may display an eye saver mode setting screen as shown in FIG. 7.

Here, a user may select a function menu item 501 or 601 through the menu button 202 or the jog button 302 provided in the main body of the display apparatus 100 or the input device 400, and operate the arrow keys 204, 205 or the jog button 302, or the input device 400 again to enable/disable the eye saver mode through the setting screen of FIG. 7.

According to an exemplary embodiment, the setting screen of FIG. 7 may be displayed in response to a user's selection of the hotkey 203, 303 or 403 corresponding to the eye saver mode described with reference to FIG. 2 to FIG. 4.

In the following description, a user's selection may be received in response to a user's input using at least one of the arrow keys 204, 205 or the jog button 302 provided in the main body of the display apparatus 100, and the buttons 404, 405 or the touch sensor 407 provided in the input device 400.

If a user selects a menu item 701 of the eye saver mode in the eye saver mode setting screen displayed in the display 130, a disabled item 702 and an enabled item 704 may be displayed to be selected by a user with respect to the corresponding mode as shown in FIG. 7. If a user selects the enabled item 704, the display 130 puts emphasis on the selected item 704 with highlights or other visual effect. The effects for the emphasis may include flickering or an animation effect, etc.

According to an exemplary embodiment, if the eye saver mode is enabled as shown in FIG. 7, the controller 170 of the display apparatus 100 detects characteristics of an image displayed on the display 130, and controls the amount of blue light emitted in the image to be gradually decreased in accordance with the detected characteristics. In this regard, it will be described again in association with the operations of the controller 170.

Figure 8:
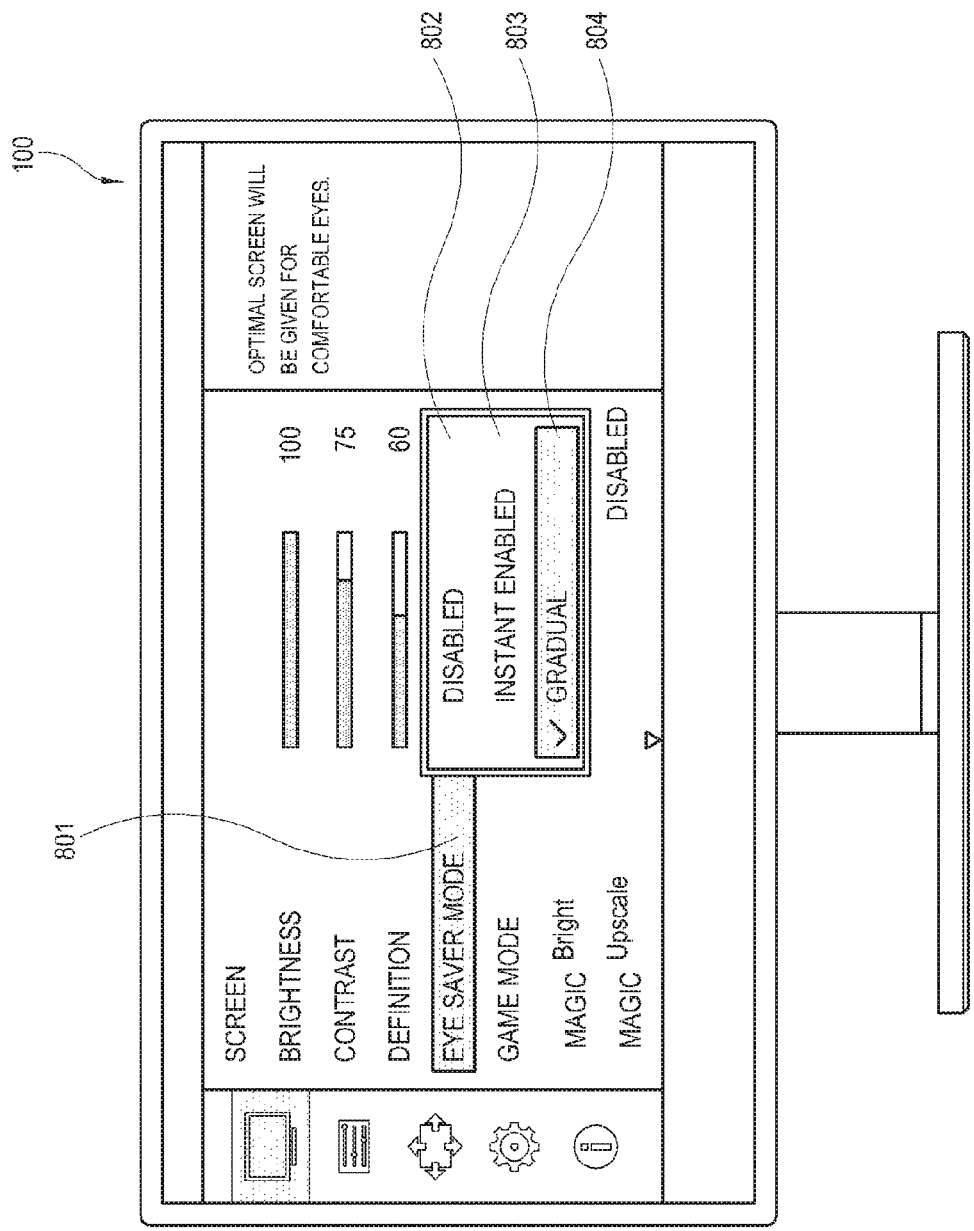

FIG. 8 illustrates a screen for enabling and disabling the eye saver mode, according to an exemplary embodiment.

If the eye saver mode is enabled by various user input sections described in FIG. 2 to FIG. 6, the display 130 may display an eye saver mode setting screen as shown in FIG. 8.

The eye saver mode setting screen of FIG. 8 further includes an item 801 for gradually switching over to the eye saver mode.

If a user selects a menu item 801 of an eye saver mode in the eye saver mode setting screen of FIG. 8, a disabled item 802, an instant enabled item 803, and a gradual enabled item 804 are displayed to be selected by a user with respect to the corresponding mode as shown in FIG. 8. If a user selects the gradual enabled item 804, the display 130 puts emphasis on the selected item 804 with highlights or other visual effect. The effects for the emphasis may include flickering or an animation effect, etc.

As illustrated in FIG. 8, if the eye saver mode is selected to be gradually enabled, the controller 170 of the display apparatus 100 detects characteristics of an image displayed on the display 130, and controls the amount of blue light emitted in the image to be gradually decreased in accordance with the detected characteristics. If the selection is to instantly enter the eye saver mode (i.e., selection of item 803), the controller 170 may control the emission amount of the blue light to be immediately decreased corresponding to a preset level. In this regard, it will be described below in association with operations of the controller 170.

According to an exemplary embodiment, the display apparatus 100 may allow a user to set options in accordance with entering/exiting the eye saver mode.

Figure 9:
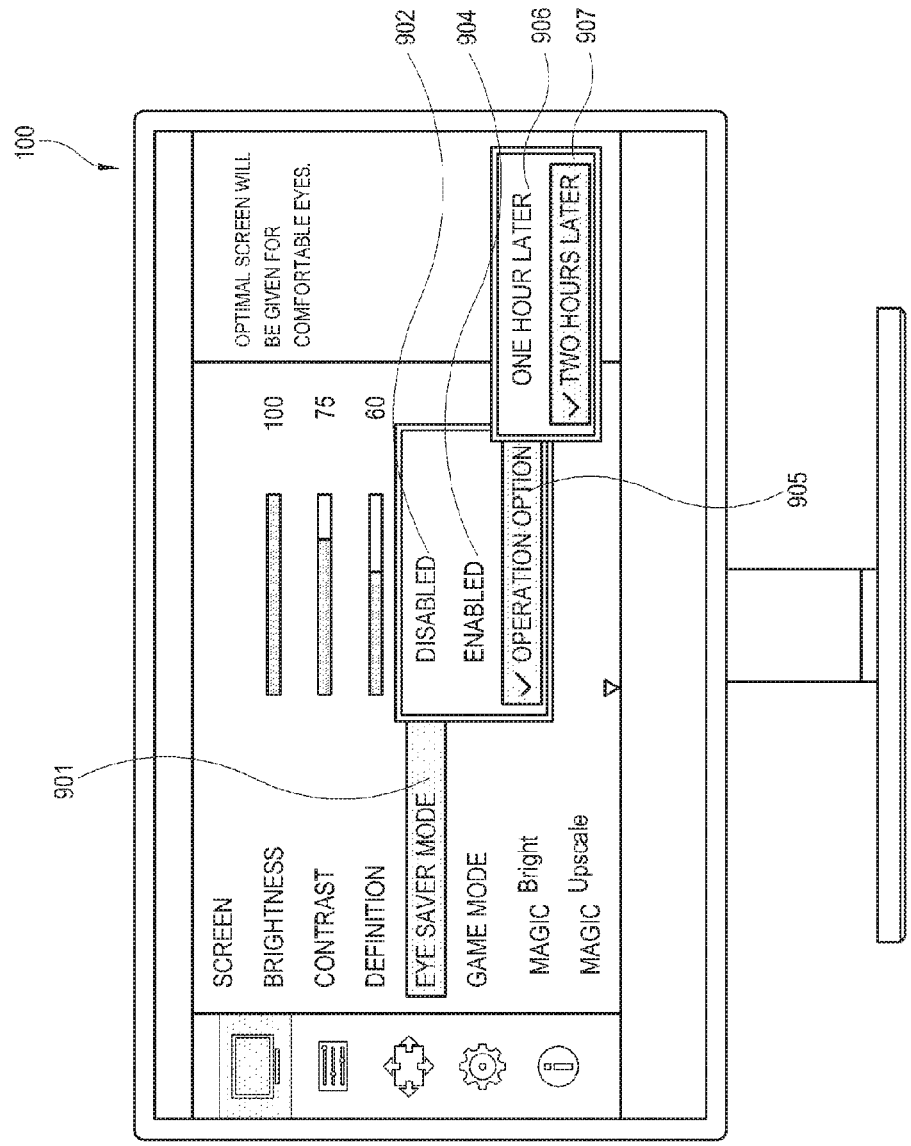

FIG. 9 shows a screen that allows a user to set an operation time of the eye saver mode.

As shown in FIG. 9, if a user selects a menu item 901 for the eye saver mode on the eye saver mode setting screen, a disabled item 902 and an instant enabled item 904 are displayed to be selected by a user with respect to the corresponding mode. According to an exemplary embodiment, an operation option item 905 may be additionally displayed.

When a user selects the operation option item 905, a one-hour-later enabled item 906 and a two-hours-later enabled item 907 may be displayed as options to be selected by a user. A user may select one of the options, e.g., the two-hours-later enabled item 907 through the user input section 140.

Here, the display 130 puts emphasis on the selected item 905, 907 with highlights or other visual effect. The effects for the emphasis may include flickering or an animation effect, etc.

As shown in FIG. 9, if the eye saver mode is selected to operate after two hours, the controller 170 of the display apparatus 100 may control the blue light level to be decreased when two hours elapses from a user's selection input. Here, the controller 170 detects characteristics of an image displayed on the display 130 and controls the amount of blue light emitted in the image to be gradually decreased in accordance with the detected characteristics.

According to an exemplary embodiment, the operation options of the eye saver mode are previously set as shown in FIG. 9, and the eye saver mode may be activated when a predetermined time (e.g., one hour) elapses from turning on the display apparatus in the future.

According to an exemplary embodiment, an operation time for a blue light reduction function is previously set, and the blue light reduction function is automatically activated by detecting whether a user's time of using, or viewing, the display apparatus 100 reaches a setting time. Because blue light may cause eye strain or problems when eyes are exposed to the blue light for a long time, the exposure to the blue light may be automatically decreased if used for a long time even though a user does not activate the foregoing mode.

Figure 10:
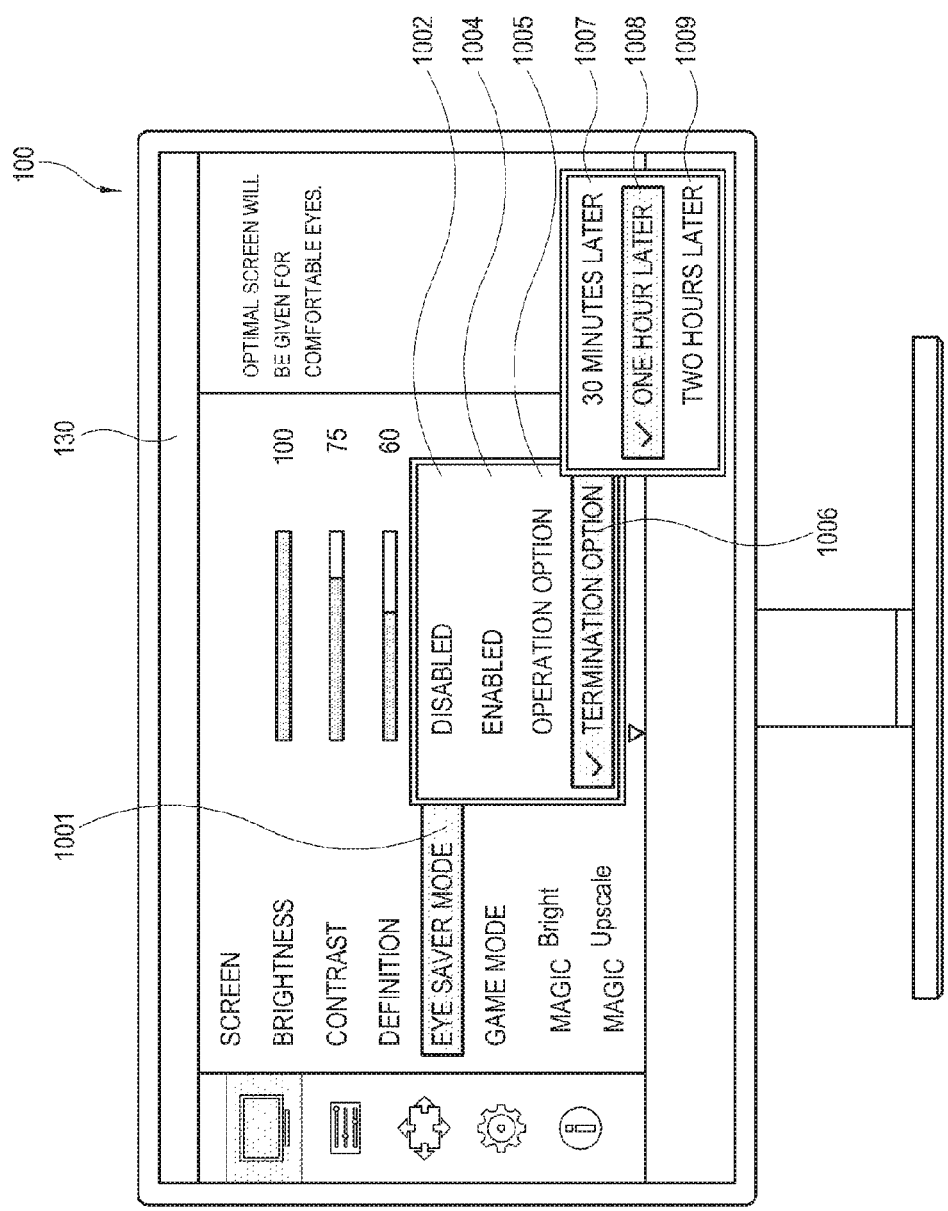

FIG. 10 shows a screen that allows a user to set a termination time of the eye saver mode.

As shown in FIG. 10, if a user selects a menu item 1001 for the eye saver mode on the eye saver mode setting screen, a disabled item 1002, an instant enabled item 1004 and an operation option item 1005 are displayed to be selected by a user with respect to the corresponding mode. According to an exemplary embodiment, a termination option item 1006 may be additionally displayed.

If a user selects the termination option item 1006, a 30-minutes-later termination item 1007, a one-hour-later termination item 1008 and a two-hours-later termination item 1009 are displayed as options to be selected by a user. A user may use the user input section 140 to select one of the options, for example, the one-hour-later termination item 1008.

Here, the display 130 puts emphasis on the selected item 1006, 1008 with highlights or other visual effects. The effects for the emphasis may include flickering or an animation effect, etc.

In the state that the eye saver mode is selected to be automatically terminated after one hour elapses from its implementation as shown in FIG. 10, the controller 170 of the display apparatus 100 may perform control to reduce the blue light in response to one of a user's various inputs as described in FIG. 2 to FIG. 8. Here, the controller 170 detects characteristics of an image displayed on the display 130, and controls the amount of blue light emitted in the image to be gradually decreased in accordance with the detected characteristics.

Further, the controller 170 stops reducing the blue light after one hour elapses from the beginning of the eye saver mode.

According to one or more exemplary embodiments, a point of time to terminate the operation of reducing the blue light may be previously set to thereby prevent a device load from being continuously increased or picture quality from being excessively degraded as the corresponding function is wastefully continued even after the emission of the blue light is reduced to some extent.

The communicator 150 includes a wired/wireless communication module (e.g., interface) to communicate with various external devices including the input device 400.

The communicator 150 transmits a command/data/information/signal received from the external device to the controller 170. The communicator 150 may transmit a command/data/information/signal received from the controller 170 to the external device.

The communicator 150 may use wireless communication as a communication method between the display apparatus 100 and the input device 400. The wireless communication may include at least one of Bluetooth, radio frequency (RF), Zigbee, infrared communication, etc.

According to an exemplary embodiment, the display apparatus 100 has a built-in communicator 150. However, the communicator may be provided in other forms. For example, the communicator may be in the form of a dongle or a module and detachably connected to a connector of the display apparatus 100.

The storage 160 (e.g., memory) stores data without limitation under control of the controller 170. The storage 160 may be achieved by a flash memory, a hard-disc drive, and other nonvolatile storage medium. The storage 160 is accessed by the controller 170, and thus the controller 170 performs reading, recording, modifying, deleting, and updating, etc., with regard to the data.

According to an exemplary embodiment, the data stored in the storage 160 may include, in addition to an operating system for operating the display apparatus 100, various applications, image data, additional data, etc., executable under the operating system.

According to an exemplary embodiment, the storage 160 may include a lookup table (LUT) 161 to perform image control for reducing the viewing fatigue level, i.e., the amount of emitted blue light. The lookup table 161 stores information about a contrast ratio (CR) corresponding to content formats of an input image, and setting values of color temperature and brightness of an image corresponding to operation time of the reduction function. The lookup table 161 may further include gain values of RGB signals corresponding to the setting value of the color temperature.

The controller 170 detects a characteristic of an image displayed on the display 130 as the reduction function of the viewing fatigue level begins, and calls out information corresponding to the detected characteristic from the lookup table 161, thereby performing image control to apply a corresponding attribute value to the image.

The controller 170 controls operations of the display apparatus 100 and controls signal flow between internal elements 120 to 160 of the display apparatus 100 to thereby process the data. For example, the controller 170 controls the image processor 120 to perform an image processing process, and performs control corresponding to a user's input received through the user input section 140 including the input device 400.

The controller 170 controls power supplied from a power supply to internal elements 120 to 160. Further, if there is a user's input or if a previously set and stored condition is satisfied, the controller 170 may execute an operating system (OS) and various applications stored in the storage 160.

The controller 170 may include at least one processor, a nonvolatile read only memory (ROM) in which a control program for controlling the display apparatus 100 is stored, and a volatile random access memory (RAM) that stores a signal or data received from the exterior of the display apparatus 100 and is used as a storage area for various jobs and applications performed in the display apparatus 100. The processor may load a program from the ROM to the RAM and execute it.

According to an exemplary embodiment, the controller 170 is achieved by at least one universal processor such as a central processing unit (CPU), an application processor (AP), a microcomputer (MICOM), etc., and, for example, runs a corresponding program loaded into the RAM by a predetermined algorithm stored in the ROM.

If the controller 170 of the display apparatus 100 is achieved by a single processor, e.g., a CPU, the CPU may be provided to implement various functions implementable in the display apparatus 100. For example, the CPU may control various image processing processes, such as decoding, demodulating, scaling, etc., with regard to an image to be displayed on the display, a response to a user's command received from the user input section 140 including the input device 400, and control for wired/wireless network communication with the external apparatus through the communicator 150.

The processor may include a single-core processor, a dual-core processor, a triple-core processor, a quad-core processor and a multiple-core processor. The processor may include a plurality of processors. For example, the processor may include a main processor and a sub processor operating in a sleep mode (e.g., in a mode supplied with standby power when not operating the display apparatus). Further, the processor, the ROM, and the RAM may be connected to one another via an internal bus.

According to an exemplary embodiment, if the display apparatus 100 is achieved with a monitor, the controller 170 may further include a graphic processing unit (e.g., GPU) for processing graphics.

According to an exemplary embodiment, if the display apparatus 100 is achieved by a digital TV, a smart phone or a smart pad, the processor may include a GPU. For example, the processor may be provided in the form of a system on chip (SoC) in which the core and the GPU are coupled.

According to an exemplary embodiment, the controller 170 may include a program that performs a function supported in the display apparatus 100, e.g., a corresponding function in response to execution of the eye saver mode. The controller may include a chip, e.g., an integrated circuit (IC) chip, that is provided as a processor dedicated for executing the corresponding program.

According to an exemplary embodiment, the controller 170 performs image control in response to activation of the eye saver mode, i.e., the beginning of the reduction function for the viewing fatigue level.

The eye saver mode may be activated by receiving one of a user's selections described with reference to FIG. 2 to FIG. 8. For example, the eye saver mode is activated in response to a user's operation to the hotkeys 203, 303, 403 provided in the display apparatus 100 or the input device 400, or a user's input for selecting the item 503, 603, 704 or 804 in the OSD menu is received through the user input section 140.

Further, as shown in FIG. 9, the eye saver mode may be automatically activated if a time to execute the eye saver mode is previously set and the time elapsed from the use (i.e., power-on) of the display apparatus 100 reaches the preset time.

In the display apparatus 100, according to an exemplary embodiment, the controller 170 performs image control to gradually reduce the viewing fatigue level, i.e., the emission amount of blue light by adjusting at least one attribute of the image displayed on the display 130 in response to the activation of the eye saver mode. Here, the attributes of the image to be controlled may include a color temperature and brightness, and the contrast ratio of the image may be controlled by adjusting the attributes.

Figure 11:
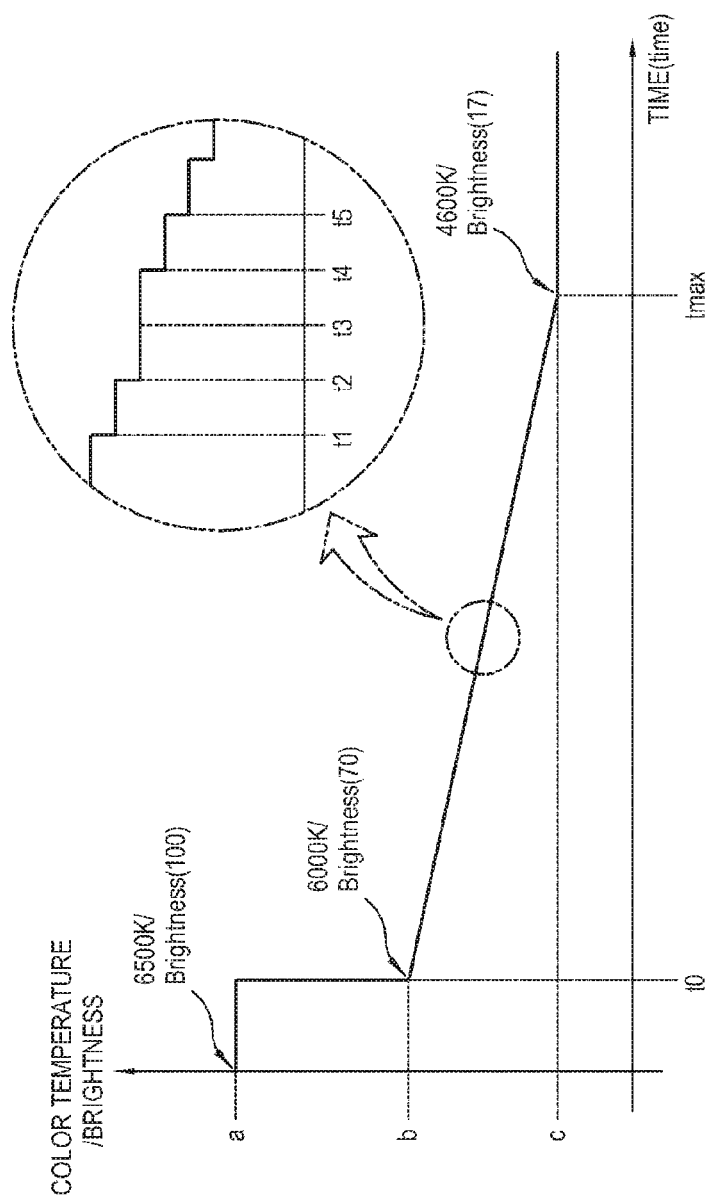
FIGS. 11 to 13 are views illustrating a procedure of controlling an image in the eye saver mode, according to an exemplary embodiment.
Figure 12:
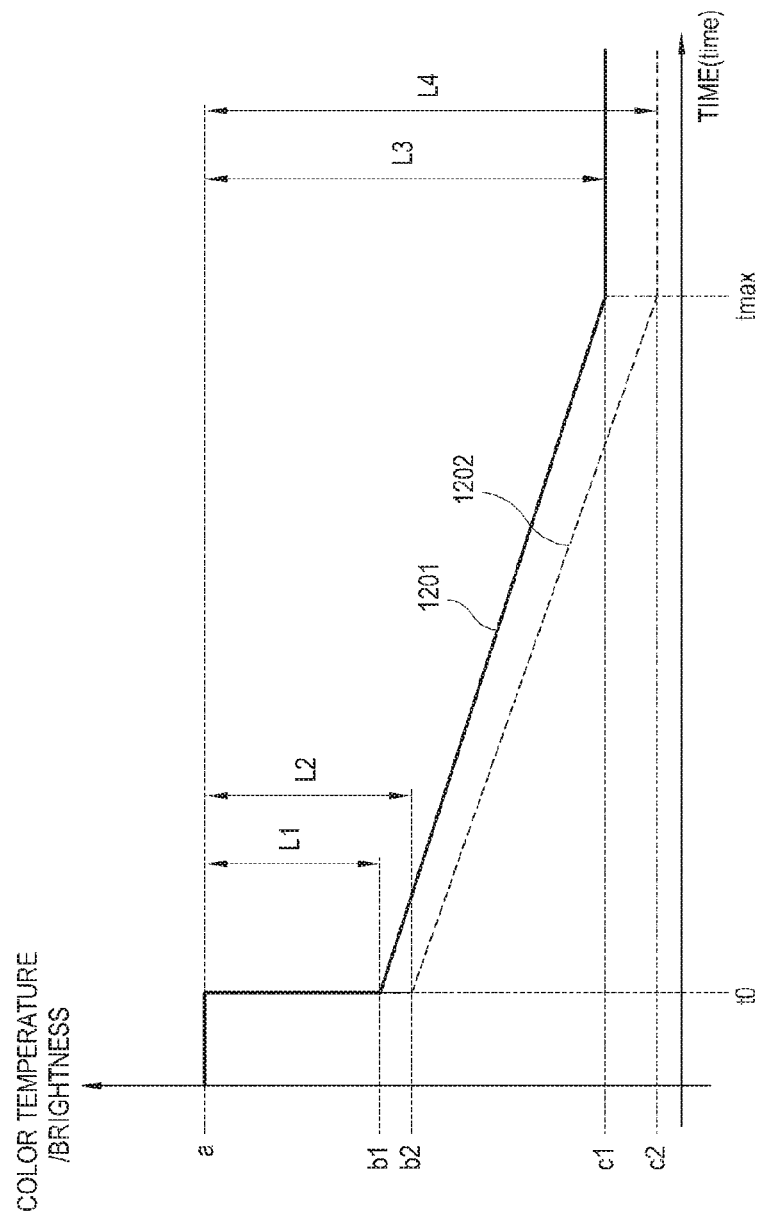
Figure 13:
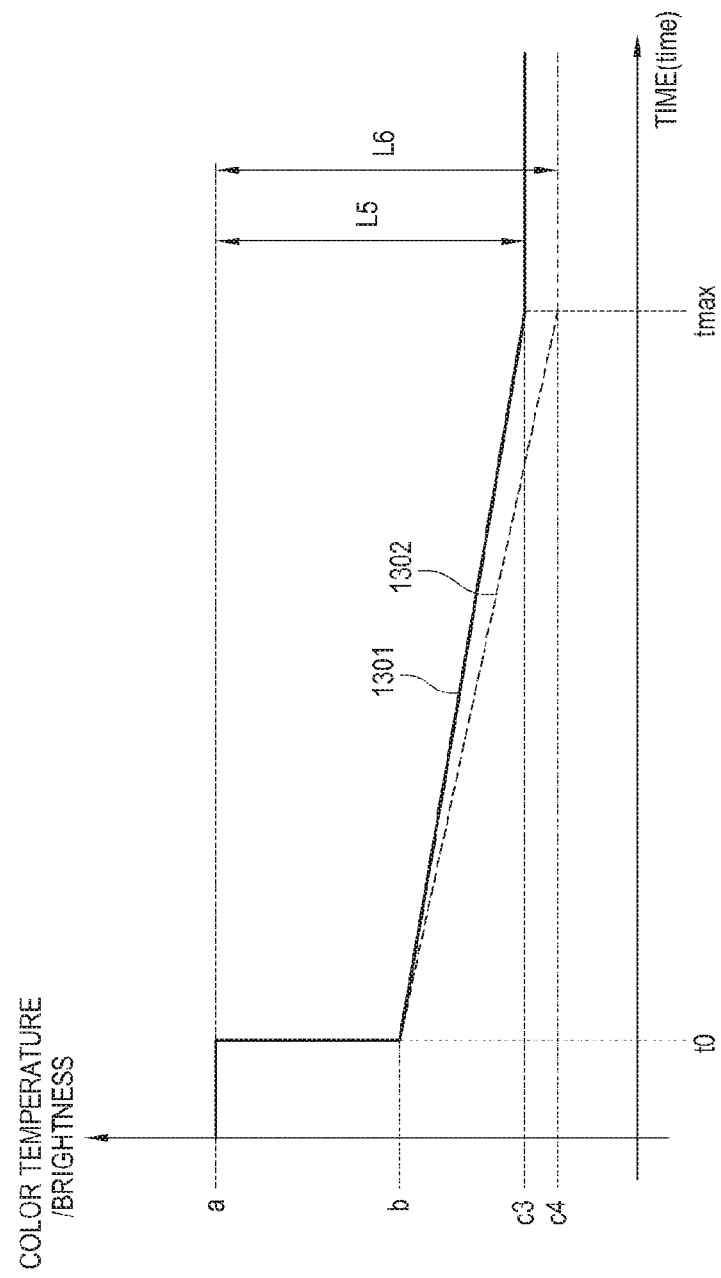

FIG. 11 to FIG. 13 are views illustrating a procedure of controlling an image in the eye saver mode, according to an exemplary embodiment;

According to an exemplary embodiment, the display apparatus 100 executes, i.e., activates the eye saver mode, thereby performing the reduction function for the viewing fatigue level.

The controller 170 performs instant level decrease for instantly reducing a viewing fatigue level of an image displayed on the display 130 by first decrement at a beginning point of time t0 as shown in FIG. 11 in response to the beginning of the reduction function. Here, the instant level decrease may be achieved by reducing at least one attribute of the image, i.e., at least one of a contrast ratio, a color temperature and brightness so that the contrast ratio of the image can correspond to a preset default value.

For example, as shown in FIG. 11, if an image has a color temperature of 6500K and a brightness of 100 before entering the eye saver mode, the color temperature may be instantly decreased to 6000K and the brightness may be instantly decreased to 70 in an instant level decrease section for the instant level decrease. FIG. 11 illustrates that both the color temperature and the brightness are decreased, but exemplary embodiments are not limited thereto. For example, only one of the color temperature and the brightness may be changed.

Further, the controller 170 may perform the instant level decrease by adjusting the contrast ratio (CR) before and after entering the eye saver mode. For example, the controller 170 may perform the instant level decrease to decrease the contrast ratio of the image by 5% (from a to b in FIG. 11) in response to the beginning of the reduction function.

A default value b corresponding to the instant level decrease, i.e., the contrast ratio, the color temperature value, and/or the brightness value may be previously set and stored in the form of the lookup table 161 in the storage 160, as long as a user does not feel visual inconvenience even when they are all adjusted at once.

As shown in FIG. 12, the default value of the instant level decrease may be set according to the category of the image, i.e., according to a moving image or a still image. For example, if the default value is excessively low in a case of a still image, a user may inconveniently recognize change in the image due to the instant level decrease.

As shown in FIG. 12, a setting value b1 of the still image may be set to be larger than a setting value b2 of the moving image. Accordingly, a change range L1 in the contrast ratio of the still image due to the instant level decrease is smaller than a change range L2 in the contrast ratio of the moving image.

The controller 170 detects a format of an image decoded in the image processor 120 (e.g., a format of contents being currently reproduced) and thus determines the category of the image, i.e., whether it is a moving image or a still image.

As shown in FIG. 11, the controller 170 gradually decreases the viewing fatigue level by a second decrement for a predetermined section (e.g., a t1-tmax section) after the instant level decrease.

The controller 170 determines whether a change characteristic of an image displayed on the display 130 in a section (e.g., time interval, a section of t1-t2 in FIG. 11), during which an image signal is received through the image receiver 110, corresponds to a section suitable for performing the reduction function. The controller 170 controls the display 130 to decrease the viewing fatigue level, i.e., the amount of blue light emitted in an image displayed on the display 130, during the determined suitable section. FIG. 11 illustrates an example in which the sections of t1-t2, t2-t3 and t4-t5 are suitable sections, but the section of t3-t4 is not a suitable section.

The controller 170 adjusts at least one attribute value of an image displayed during the suitable section, thereby decreasing the viewing fatigue level. The controller 170 may adjust at least one among the contrast ratio, the color temperature and the brightness of the image during the suitable section.

The controller 170 may periodically detect a change characteristic, i.e., activity of an image displayed on the display 130, in real time. The change characteristic of the image includes variation in an average picture level (APL) with regard to the brightness of the displayed image.

The controller 170 may sense the average picture level of brightness, i.e., variation in brightness of a screen, with regard to an image displayed during a section (e.g., the section of t1-t2) of an image signal.

The controller 170 detects an average brightness change of an image in real time based on the APL of an image, i.e., contents displayed on the display 130, during a section of an image signal, and compares the detected value with a preset threshold (e.g., an APL threshold). If the detected APL value is higher than the threshold for a predetermined period of time, this section is determined as the suitable section for performing the reduction function of the viewing fatigue level, thereby generating a control signal for adjusting at least one attribute value of the image.

According to an exemplary embodiment, the controller 170 checks a frequency of cases in which the APL detected for a predetermined period of time corresponding to a section is higher than the threshold, and determines the corresponding section as a suitable section for performing the reduction function of the viewing fatigue level if the checked frequency is higher than a predetermined number of times.

The change characteristic of the image further includes regularity of a motion vector in the displayed image. Thus, the controller 170 detects information about horizontal/vertical (H/V) motion vector of the image displayed in a section of an image signal, and determines the corresponding section as a suitable section based on the detected regularity of the horizontal/vertical motion vector.

The controller 170 may detect a H/V motion vector if an image, i.e., contents displayed on the display 130, corresponds to a motion vector-based screen. For example, if the screen displayed on the display 130 is a screen changed by scroll control of a document, a web page, a coding window of a program, etc., it is determined as a motion vector-based screen. The controller 170 may detect information about the H/V motion vector in accordance with scroll/stop of the displayed screen.

In accordance with the detection results, if it is determined that at least one of a horizontal motion vector and a vertical motion vector has regularity, a scroll is performed on the screen where contents are displayed. Thus, if the H/V motion vector has regularity, the controller 170 determines the corresponding section as a suitable section.

According to an exemplary embodiment, the controller 170 combines the H/V motion vector information and the APL information and determines a section of an image signal as a suitable section for performing the reduction function of the viewing fatigue level. For example, if a frequency in which the change range in the APL is higher than the threshold is higher than a predetermined number of times, or if the H/V motion vector has regularity (i.e., if at least one condition is satisfied), the corresponding section is determined as a suitable section.

Further, when the corresponding section of the image signal is determined as a suitable section, the controller 170 generates and provides a control signal for adjusting at least one attribute value of an image displayed during that suitable section. This control signal is provided to at least one of the image processor 120 and the display 130, and controls at least one among the contrast ratio, the color temperature and the brightness of the image.

According to an exemplary embodiment, the display apparatus 100 may determine a control point of time to the color temperature/brightness/CR by combining the H/V motion vector value and the APL value of the displayed contents. That is, the suitable section is determined based on a combination of the detected H/V motion vector value and the APL value, and it is determined that the adjusted attribute values are immediately applied in the case of a suitable section. For instance, the content category/APL value and its change range/regularity of the motion vector are combined, and the control point of time is determined as an instant application or a non-application based on the combination as described in the following table 1.

TABLE 1

| Category | APL | Change range in APL | Motion Vector (H/V) regularity | Application point of time |
|---|---|---|---|---|
| Moving image | High | High | Yes/No | Instant or non-application |
| | | Low | Yes/No | Instant or non-application |
| | Low | High | Yes/No | Instant or non-application |
| | | Low | Yes/No | Instant or non-application |
| Still image | High | High | Yes/No | Instant or non-application |
| | | Low | Yes/No | Instant or non-application |
| | Low | High | Yes/No | Instant or non-application |
| | | Low | Yes/No | Instant or non-application |

The controller 170 combines the above change characteristics of the image, and generates a control signal for adjusting at least one attribute value of the image in the corresponding section of the image signal if the instant application is determined, i.e., the suitable section for performing the reduction function is determined.

The controller 170 may call out or load data from the lookup table 161 of the storage 160 to generate the control signal as described above.

That is, the lookup table 161 may store setting values about a color temperature and brightness of an image corresponding to an operation time for a reduction function with respect to a gradual decrease section in which the instant level decrease reduction function operates. The controller 170 loads the color temperature and the brightness corresponding to the operation time of the reduction function from the lookup table 161 during the suitable section, and generates a control signal for applying the loaded color temperature and brightness to an image to be displayed.

Here, the storage 160 may further store a color temperature table as another lookup table 161 where gain values of RGB signals (i.e. a red signal, a green signal and a blue signal) corresponding to the setting values of the color temperatures in the lookup table 161. The controller 170 may load a gain value of an RGB signal corresponding to the loaded color temperature from the color temperature table, and control the image processor 120 to apply the color temperature corresponding to the operation time of the suitable section based on the gain value of the loaded RGB signal to an image to be displayed.

The values of the color temperature table may be previously calculated and stored in the storage 160. According to an exemplary embodiment, values for red, green, and blue are calculated together to lay a change range of wavelength (e.g., Δuv) within a preset range.

The lookup table 161 including the color temperature table above examines and stores R/G/B gain values and brightness values corresponding to the color temperature/brightness. If the display apparatus 100 supports a calibration function, the values may be determined by simulation using color temperature/brightness values and their final target values as seeds when the calibration is controlled.

During the section t0-tmax in which the foregoing gradual level decrease is performed, the color temperature and/or the brightness may be linearly decreased as shown in FIG. 11.

For example, if the image subject to the instant level decrease has a color temperature of 6000K and brightness of 70 as shown in FIG. 11, the color temperature of the image is gradually decreased to 4600K and the brightness is gradually decreased to 17 during the gradual decrease section in which the gradual level decrease is performed. FIG. 11 illustrates an example in which both the color temperature and the brightness are decreased, but exemplary embodiments are not limited thereto. Alternatively, one of the color temperature and the brightness may be changed.

The controller 170 may perform the gradual level decrease by controlling the contrast ratio (CR) before and after operation in the suitable sections t1-t2, t2-t3 and t1-t5. For example, the controller 170 may control the display 130 to decrease the contrast ratio of the image by 0.01% if the suitable section for the reduction function is determined.

A target value c corresponding to the gradual level decrease, i.e., the contrast ratio or the color temperature and/or the brightness, are previously set and stored as the lookup table 161 in the storage 160 so that the viewing fatigue level, i.e., the emission amount of blue light, is too low to be not harmful to a human body.

The target values for the gradual level decrease may be respectively set corresponding to the categories of the image, i.e., the moving image or the still image, as shown in FIG. 12 and FIG. 13. For example, in the case of a still image, if the target value is set to be excessively low, a user may feel inconvenience with regard to the change in the image during the gradual level decrease.

According to an exemplary embodiment, as shown in FIG. 12, the target value c1 of the still image may be set to be higher than the target value c2 of the moving image. Accordingly, the change range L3 in a contrast ratio of a still image 1201, to which the instant level decrease and the gradual level decrease are applied in sequence, is smaller than the change range L4 in a contrast ratio of a moving image 1202. That is, the change range L4 in the contrast ratio of the moving image 1202 is larger than the change range L3 in the contrast ratio of the still image 1201.

Similarly, FIG. 13 shows that a change range L6 in a contrast ratio of a moving image 1302 is larger than a change range L5 in a contrast ratio of a still image 1301. FIG. 13 illustrates an example in which a default value b of the instant level decrease is equally set regardless of the categories of the image.

The controller 170 may detect change in the category of the image displayed on the display 130 while the reduction function for the viewing fatigue level is performed. For example, a user may do web surfing through a web browser while the gradual level decrease is performed, and then execute a media player to view a moving image.

The controller 170 controls the gradual level decrease to be performed within the change range in the contrast ratio corresponding to the changed category. That is, the target value is c3 at the beginning of the reduction function for the viewing fatigue level, but finally reaches C4 at function completion.

The controller 170 may stop the reduction function of the viewing fatigue level if an attribute value of an image reaches a target value as the reduction function for the viewing fatigue level is performed, or if a preset operation time elapses. Here, the operation time may be set corresponding to the selected item 1008 in the termination option 1006 of FIG. 10, in which FIG. 10 shows an example in which the operation time is set to one hour.

According to an exemplary embodiment, the operation time of the reduction function for the viewing fatigue level is set by a user's selection. However, an operation time may be previously determined when a product is manufactured. If the operation time is previously set, the corresponding information may be stored in the lookup table 161.

According to an exemplary embodiment, the controller 170 may perform control for reducing a viewing fatigue level of an image in a suitable section in such a manner that a contrast ratio (CR) of a screen is decreased by adjusting an RGB offset value in a scaler of the image processor 120 with reference to the lookup table 161 of the storage 160. Further, if an attribute value of an image reaches a target value or if a preset operation time elapses, the reduction function for the viewing fatigue level is terminated.

According to an exemplary embodiment, the display apparatus 100 may adjust an attribute value of an image in accordance with surrounding environments while the reduction function is performed. For example, the target value, i.e., the change range, may be varied depending on brightness (e.g., intensity of illumination) of external light. To this end, the display apparatus 100 may include a brightness sensor to sense the brightness of external light.

The brightness may be affected by reflectivity due to the brightness of external light, and a characteristic of an image viewed by a user may be varied depending on a unique color temperature of a light source around the color temperature of the image. Further, visibility of a displayed image may be affected by the brightness of surrounding light. Accordingly, the lookup table 161 may store data calculated to gradually change the picture quality due to adjustment in the attribute value of the eye saver mode under various conditions of external light. For example, the brightness value may be calculated to be lowered in a dark place rather than a bright place.

FIG. 11 to FIG. 13 illustrate an example in which the instant level decrease and the gradual level decrease are sequentially performed as an option of the reduction function for the viewing fatigue level performed in response to the implementation of the eye saver mode.

According to an exemplary embodiment, the display apparatus 100 includes a plurality of options with regard to the reduction function for the viewing fatigue level, and the reduction function is performed in accordance with options selected by a user.

For example, if a user selects the menu item 801 of the eye saver mode in the eye saver mode setting screen of FIG. 8, the instant enabled item 803 and the gradual enabled item 804 may be displayed as options to be selected by a user.

If a user selects the gradual enabled item 804, as described with reference to FIG. 11 to FIG. 13 the controller 170 performs the instant level decrease for immediately decreasing the viewing fatigue level of the image displayed on the display 130 by the first decrement at a point of time t0 in response to the beginning of the reduction function for the viewing fatigue level, and performs the gradual level decrease for decreasing the viewing fatigue level by the second decrement during a predetermined section t0-tmax in succession to the instant level decrease.

The controller 170 may detect a characteristic of an image displayed on the display 130 during the section t0-tmax of performing the instant level decrease, and gradually decrease the amount of blue light emitted in the image in accordance with the detected characteristics.

Figure 14:
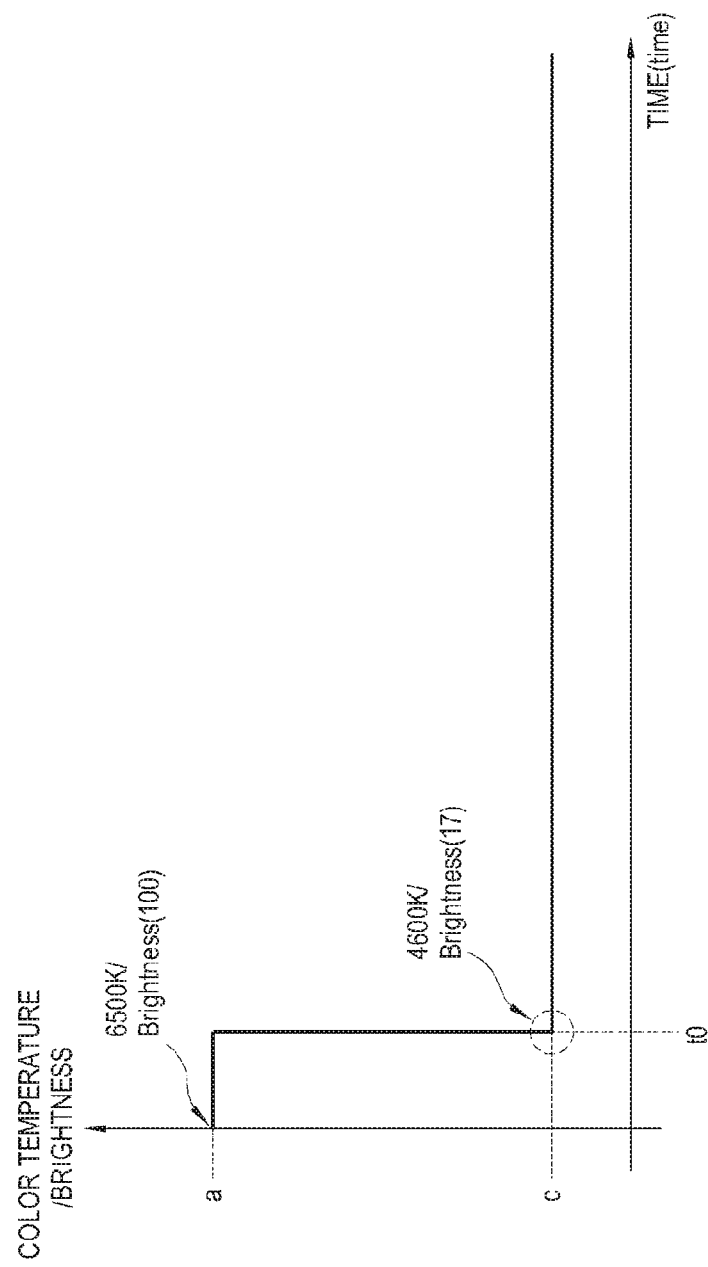
FIG. 14 is a view illustrating a procedure of controlling an image in the eye saver mode, according to an exemplary embodiment.

FIG. 14 is a view for explaining a procedure of controlling an image in the eye saver mode, according to an exemplary embodiment;

A user may select the instant enabled item 803 on the eye saver mode setting screen of FIG. 8. That is, a user may select the amount of blue light to be decreased to a preset level as soon as possible even while accepting visual inconvenience due to a temporary change in the image (i.e., change in brightness).

If a user selects the instant enabled item 803, the controller 170 controls the viewing fatigue level of the image displayed on the display 130 to be decreased at once by a predetermined level corresponding to the target value (from a to c) at a point of time t0 as shown in FIG. 14 in response to the beginning of the reduction function for the viewing fatigue level.

The target value c, i.e., the contrast ratio or the color temperature and/or the brightness, may be previously set and stored as the lookup table 161 in the storage 160 so that the viewing fatigue level, i.e., the emission of blue light, is too low to be not harmful to a human body. Referring to FIG. 14, the target value corresponding to 'c' may be a color temperature of 4600K and brightness of 17 like those shown in FIG. 11.

The target value may be set with respect to the categories of the image, i.e., whether it is a moving image or a still image. For example, the target value of a still image is set to be higher than the target value of a moving image, and therefore the change range in the contrast ratio of the moving image is set to be higher than the change range in the contrast ratio of the still image.

The controller 170 may detect change in the category of the image displayed on the display 130 after the reduction function for the viewing fatigue level is performed as shown in FIG. 14. For example, if a predetermined period of time elapses after a point of time t0 at which a user does web surfing using a web browser, s/he may execute the media player to view the moving image contents. The controller 170 may further adjust an attribute value of an image with a target value for a change range in a contrast ratio corresponding to the changed category. That is, if the category of the image is changed, the target value of the reduction function for the viewing fatigue level may be changed corresponding to the changed category.

Below, a control method of the display apparatus, according to an exemplary embodiment, will be described with reference to FIG. 15.

Figure 15:
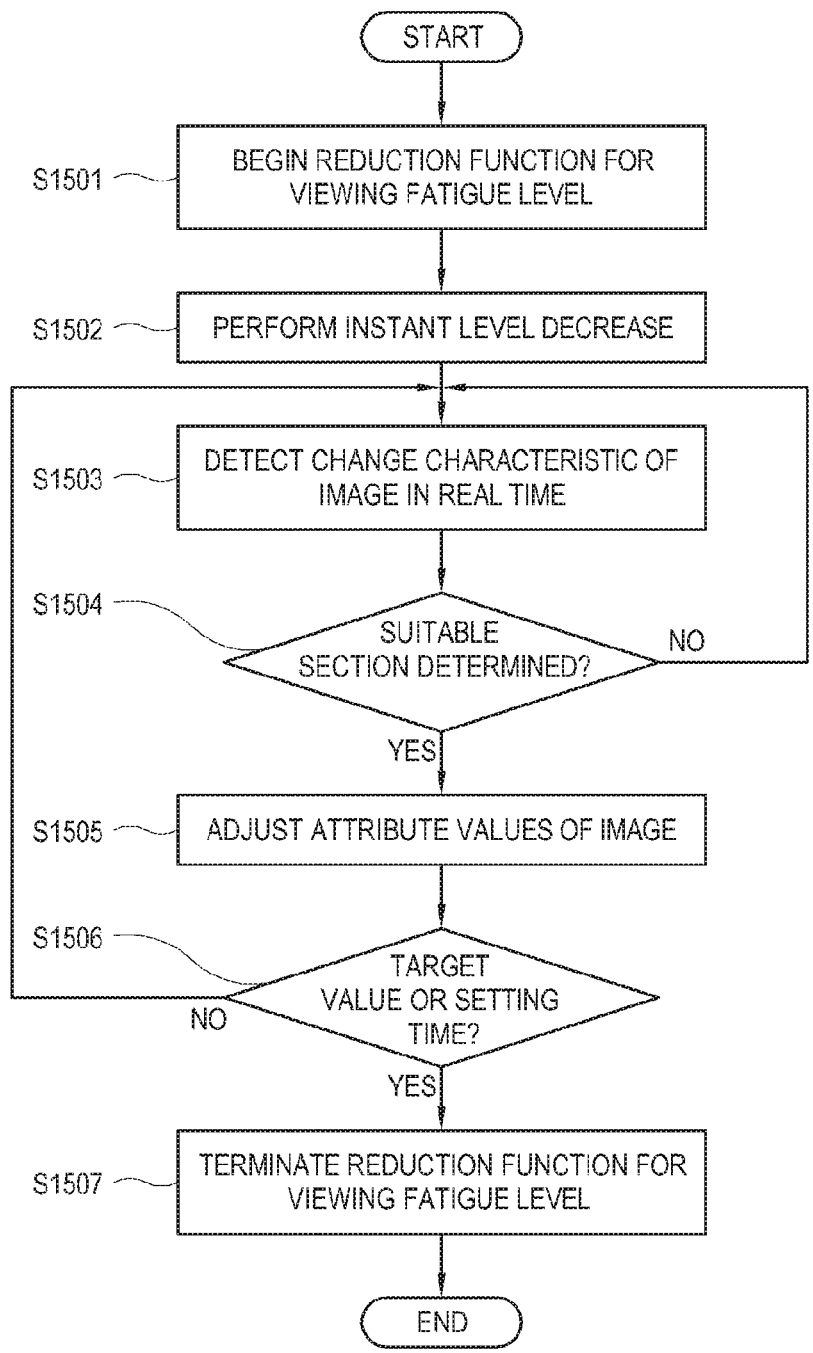
FIG. 15 is a flowchart showing a control method of a display apparatus, according to an exemplary embodiment.

FIG. 15 is a flowchart showing a control method of a display apparatus, according to an exemplary embodiment.

As shown in FIG. 15, the display apparatus 100 may activate the eye saver mode for reducing a predetermined viewing fatigue level, i.e., the blue light (S1501). Here, the eye saver mode may be activated in response to a user's selection using the user input section 140 described with reference to FIG. 2 to FIG. 8, and may be implemented at a preset operation beginning time described with reference to FIG. 9.

In response to the beginning of the reduction function in the operation S1501, the display apparatus 100 performs the instant level decrease for immediately decreasing the viewing fatigue level of the image, displayed on the display 130, by the first decrement (S1502). The controller 170 may perform the instant level decrease based on the default value stored in the lookup table 161. The lookup table 161 stores at least one default value of the contrast ratio, color temperature and brightness of the image as the attribute values for the image corresponding to the instant level decrease, and the default value may correspond to the category of the image displayed on the display 130.

According to an exemplary embodiment, the display apparatus 100 performs the gradual level decrease for gradually decreasing the viewing fatigue level by the second decrement during a predetermined section after the instant level decrease of the operation S1502.

The controller 170 detects a change characteristic of an image displayed on the display in real time during a section of an image signal (S1503). Here, the change characteristic of the image may include a change range in an average picture level (APL) of brightness, regularity of a motion vector, etc., with respect to the image.

The controller 170 determines which section of a corresponding image signal is a suitable section or not based on the change characteristic of the image detected in the operation S1503 (S1504). That is, the controller 170 detects the average picture level of brightness with respect to the image displayed in a section and a change range in the average picture level, compares the change range of the detected average picture level with a threshold, and determines the section of the image signal as the suitable section. Further, the controller 170 detects the horizontal/vertical motion vector information about the image displayed in the section of the image signal, and determines the section as the suitable section based on the regularity of the detected horizontal/vertical motion vector. The controller 170 combines the change range of the APL, the regularity of the motion vector, and other information, and determines whether the corresponding section of the image signal is a suitable section.

If it is determined in the operation S1504 that the section of the image signal is determined as a suitable section, the controller 170 may adjust at least one of the attribute values, i.e., among the contrast ratio, the color temperature and the brightness of the image displayed on the display 130 (S1505). Here, the controller 170 loads a color temperature corresponding to the operation time of the reduction function (e.g., a gain value of an RGB signal corresponding to the color temperature) and a brightness value from the lookup table 161 during the suitable section, and controls the display 130 to apply the loaded color temperature and brightness value to the image displayed thereon. The storage 160 may store the setting values of the color temperature and brightness of the image corresponding to the operation time of the reduction function for performing the gradual level decrease, the gain values of the RGB signals corresponding to the setting value of the color temperature, etc., as the lookup table 161.

According to an exemplary embodiment, the display apparatus 100 repetitively performs the operations S1503 and S1504 while performing the gradual level decrease. That is, the suitable section is determined according to the respective sections of the image signal as time goes on, and thus the attribute value is immediately applied or not applied. With these procedures, the viewing fatigue level is controlled to be gradually decreased.

The controller 170 terminates the reduction function for the viewing fatigue level in operation S1507 if the attribute value of the image displayed on the display 130 reaches the target value by repetitively performing the gradual level decrease in the operation S1503 and S1504 or when the preset operation time elapses (S1506-YES).

According to the reduction function for the viewing fatigue level, described above, the bright light may be reduced by about 70% or more when the operation is completed. Therefore, fatigue in a user's eyes and body is relieved even though s/he watches a TV for a long period of time.

According to one or more exemplary embodiments, the reduction function for the viewing fatigue level may be applied to various types of the display apparatus 100.

FIGS. 16A to 16F are views of exemplary apparatuses for the display apparatus 100, according one or more exemplary embodiments.

Figure 16A:
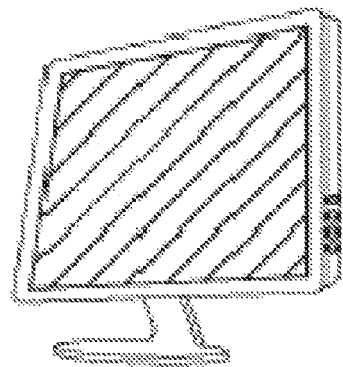
FIGS. 16A to 16H are views of exemplary apparatuses for a display apparatus, according to one or more exemplary embodiments.

FIG. 16A illustrates that the display apparatus 100, according to an exemplary embodiment, is used as a monitor or similar display device. The display apparatus 100 may be attached and installed to a television, a digital sign, a large format display (LFD), and other large-sized apparatuses or stationary apparatuses, as well as the monitor. The display apparatus 100 receives external power, and the elements of the display apparatus 100 may be designed to achieve high picture quality under stable supply of power.

Figure 16B:
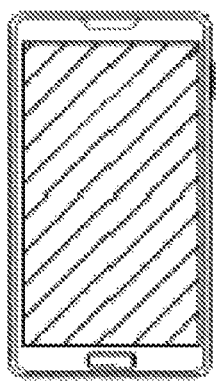

FIG. 16B illustrates that the display apparatus 100, according to an exemplary embodiment, is a mobile device. The mobile device may be at least one of a smart phone, a cellular phone, a personal digital assistant (PDA), and other small device or a mobile apparatus. If the display apparatus 100 is installed on the small device, it uses a battery without receiving external power. Therefore, the elements of the display apparatus 100 may be designed in consideration of a capacity of a battery, and may be designed to make the eye saver mode correspond to a separate low-power sub screen mode. The mobile device may be susceptible to power consumption, and thus configured to minimize power consumption in the eye saver mode. The display apparatus 100 may have a touch screen for a user's input. The touch screen may be formed on the display 130.

Because the mobile device is a hand-held device and is used outside, the attribute values to be adjusted in the eye saver mode are set to be susceptible to the external light. It may be determined whether the use environment is an indoor environment or an outdoor environment, and therefore the attribute value may be precisely adjusted. Because the mobile device is susceptible to the external light, visibility may be instantly deteriorated. Therefore, the eye saver mode may be executed through external input unit, e.g., the hotkey.

Figure 16C:
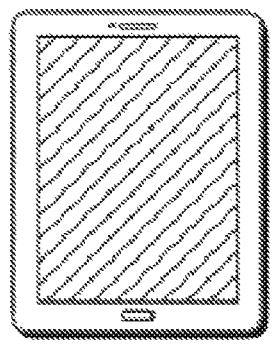

FIG. 16C illustrates that the display apparatus 100, according to an exemplary embodiment, is a smart pad such as a tablet PC. The smart pad makes it possible to do various document editing, image editing, an image drawing job, etc., of higher resolution or the moving image information such as multimedia compared to the mobile device. Thus the tablet PC is configured to execute the eye saver mode corresponding to each job, match the setting values of the eye saver mode with various environmental elements, and minimize the power consumption in the eye saver mode.

Figure 16D:
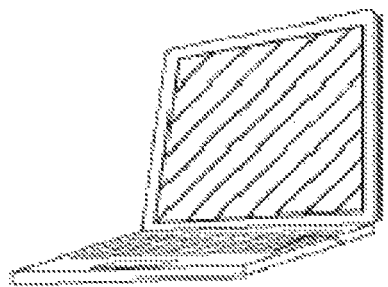

FIG. 16D illustrates that the display apparatus 100, according to an exemplary embodiment, is used as a notebook computer. In the notebook computer, a user may use a function key, the OSD or a user input section 140 to enter the eye saver mode and change the attribute values in response to the change characteristics of the image. The notebook computer may operate various eye saver modes through an application installed by a manufacturer. The application installed by the manufacturer may include a self-driving driver with respect to the display, and therefore more detailed picture quality adjustment is possible.

Figure 16E:
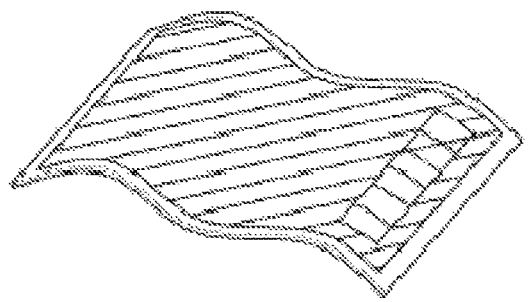

FIG. 16E illustrates that the display apparatus 100, according to an exemplary embodiment, is used as a flexible display apparatus. The flexible display apparatus may be configured to maximize or minimize the image characteristic due to the flexibility of the display. For example, the attribute value may be adjusted to minimize awareness of difference in pixels stretched by a curved surface in the flexible apparatus. On the other hand, the attribute value may be adjusted to emphasize the curved portion. In addition, a curvature at the curved portion is measured as an environmental element, and the attribute value may be adjusted in accordance with the measured curvature. The flexible apparatus may include a supporter to limit the flexibility, and may be added with a film, a protection layer, a protection film, etc., suitable for the flexible display. The flexible apparatus may display a user interface selectable by a user on a screen.

Figure 16F:
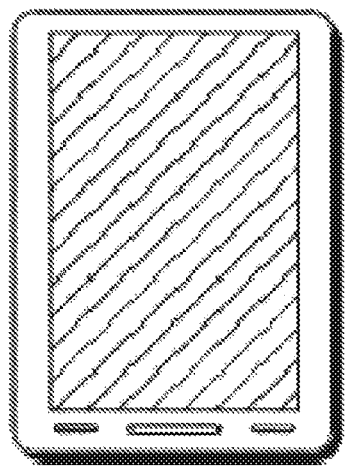

FIG. 16F illustrates that the display apparatus 100, according to an exemplary embodiment, is used as an E-book apparatus. A user may concentrate on reading a text on the E-book apparatus for a long time, and therefore the display apparatus 100 may enter the eye saver mode for preventing a user's eye fatigue. The E-book apparatus may further include an input unit for turning pages.

Figure 16G:
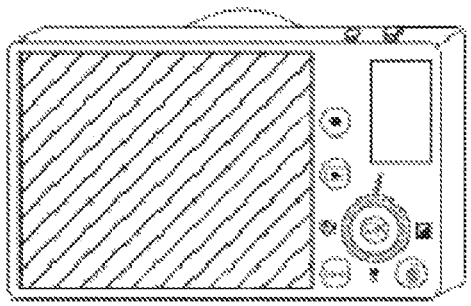

FIG. 16G illustrates that the display apparatus 100, according to an exemplary embodiment, is applied to a digital camera. The digital camera may enter the eye saver mode to relieve eye fatigue while a user checks photographed images.

Figure 16H:
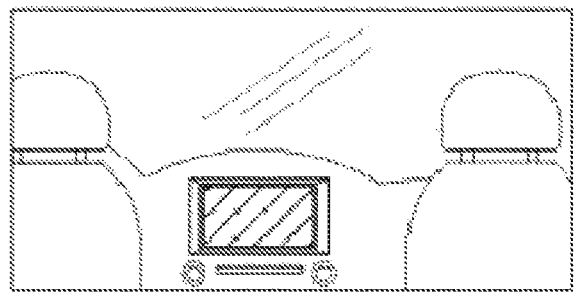

FIG. 16H illustrates that the display apparatus 100, according to an exemplary embodiment, is used as a navigation device for a vehicle. The navigation device is driven under the external light, and therefore the attribute values in the eye saver mode may be adjusted to prevent visibility from being deteriorated due to sunlight.

Features according to one or more exemplary embodiments may be partially or wholly combined or mixed, and it will be understood by those skilled in the art that exemplary embodiments are technically interlocked and driven and may be realized independently or connected together.

According to an exemplary embodiment, a viewing fatigue level, i.e., blue light, which may be harmful to a user's body, is gradually reduced, thereby preventing instant change in picture quality and minimizing a user's inconvenience.

A change characteristic of an image to be displayed (e.g., activity) is analyzed to adjust an attribute value such as contrast ratio/color temperature/brightness at an optimal point of time. Thus, it may be difficult for a user to recognize change in picture quality. Further, a user's eye fatigue is relieved even while viewing the image for a long time, thereby providing a comfortable screen.

A change range of a contrast ratio optimized according to a category of an image is applied to improve an efficiency of a function and a user's convenience.

Further, the reduction function for the viewing fatigue level is performed to lower the brightness of the screen, thereby decreasing power consumption.

One or more exemplary embodiments may be implemented with a computer-readable recording medium. The computer-readable recording medium may include a transfer medium and a storage medium for storing data readable by a computer system. The transfer medium may be implemented with a wired and/or wireless network to which the computer system is connected.

Exemplary embodiments may be implemented by hardware, software, and/or a combination of hardware and software. As hardware, the controller 170 may include a nonvolatile memory in which the software, e.g., a computer program, is stored, a RAM to which the computer program stored in the nonvolatile memory is loaded, and a CPU for executing the computer program loaded to the RAM. The nonvolatile memory may include a hard disk drive, a flash memory, a ROM, CD-ROMs, magnetic tapes, a floppy disc, an optical storage, a data transfer device using Internet, etc., but is not limited thereto. The nonvolatile memory may refer to a kind of computer-readable recording medium in which a program readable by a computer is recorded.

The computer program is a code that is read and executed by the CPU, and includes codes for performing the operations S1501 to S1507 of the controller 170 shown in FIG. 15.

The computer program may be included in an operating system provided in the display apparatus 100 or software including an application and/or software interfacing with an external device.

Although exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. A display apparatus comprising:
a display configured to display an image;
a user input interface configured to receive a user input; and
at least one processor configured to:
in response to the user input for beginning a viewer fatigue reduction function, detect an average picture level of an image displayed on the display during a first time interval,
determine the first time interval as a suitable time interval for the viewer fatigue reduction function based on a comparison of the average picture level with a threshold, and
control the display to decrease a viewing fatigure level of the displayed image.

2. The display apparatus according to claim 1, wherein the processor is further configured to decrease the viewing fatigue level by adjusting at least one attribute value of the displayed image during the suitable time interval, the viewing fatigue level comprising an emission amount of blue light and an attribute of the image comprising at least one among a contrast ratio, a color temperature, and brightness of the image.

3. The display apparatus according to claim 2, wherein the processor is further configured to determine a category of the displayed image, and determine a change range of a contrast ratio due to a decrease in the viewing fatigue level according to the determined category of the image.

4. The display apparatus according to claim 3, wherein the category of the image comprises a moving image and a still image, and a change range of a contrast ratio of the moving image is larger than a change range of a contrast ratio of the still image.

5. The display apparatus according to claim 4, wherein the processor is further configured to, in response to a change in the category of the displayed image, decrease the viewing fatigue level within a change range of a contrast ratio corresponding to the changed category.

6. The display apparatus according to claim 2, further comprising a memory configured to store a lookup table of setting values of color temperature and brightness of an image corresponding to an operation time of the viewer fatigue reduction function,
wherein the processor is further configured to load the color temperature and the brightness corresponding to the operation time of the viewer fatigue reduction function from the lookup table during the suitable time interval, and control the display to apply the loaded color temperature and the brightness to the displayed image.

7. The display apparatus according to claim 6, wherein the memory is further configured to store a color temperature table in which a gain value of a red/green/blue (RGB) signal corresponding to the setting value of the color temperature is stored, and
the processor is further configured to load a gain value of the RGB signal corresponding to the loaded color temperature from the color temperature table and control the display to apply the color temperature corresponding to the operation time of the suitable time interval based on the loaded gain value of the RGB signal to the displayed image.

8. The display apparatus according to claim 1, wherein the processor is further configured to, in response to beginning the viewer fatigue reduction function, perform an instant level decrease for immediately decreasing the viewing fatigue level of the displayed image by a first decrement, and perform a gradual level decrease for gradually decreasing the viewing fatigue level by a second decrement during a predetermined time interval, after the instant level decrease, and the gradual level decrease is controlled to decrease the viewing fatigue level during the determined suitable time interval in accordance with the average picture level of the image.

9. The display apparatus according to claim 1, wherein the processor is further configured to, in response to an attribute value of the displayed image reaching a target value or a preset operation time elapsing, terminate the viewer fatigue reduction function, and the target value corresponds to a category of the displayed image.

10. A display apparatus comprising:
a display configured to display an image;
a user input interface configured to receive a user input; and
at least one processor configured to:
in response to the user input for beginning a viewer fatigue reduction function, detect a motion vector of an image displayed on the display during a first time interval,
determine the first time interval as a suitable time interval for the viewer fatigue reduction function based on a regularity of the motion vector, and
control the display to decrease a viewing fatigue level of the displayed image.

11. A method of controlling a display apparatus, the method comprising:
receiving, by a user input interface, a user input for beginning a viewer fatigue reduction function;
detecting, by at least one processor, an average picture level of an image displayed on a display during a first time interval of an image signal in response to beginning the viewer fatigue reduction function;
determining, by the at least one processor, the first time interval as a suitable time interval for a viewer fatigue reduction function based on a comparison of the average picture level with a threshold; and
controlling, by the at least one processor, the displayed image to decrease a viewing fatigue level of the displayed image.

12. The method according to claim 11, wherein the controlling the image comprises decreasing, by the at least one processor, the viewing fatigue level by adjusting at least one attribute value of the displayed image during the suitable time interval,
wherein the viewing fatigue level comprises an emission amount of blue light, and an attribute of the image comprises at least one among a contrast ratio, a color temperature and brightness of the image.

13. The method according to claim 12, further comprising determining, by the at least one processor, a category of the displayed image, wherein a change range of a contrast ratio due to decrease in the viewing fatigue level is determined according to the determined category of the image.

14. The method according to claim 13, wherein the category of the image comprises a moving image and a still image, and a change range of a contrast ratio of the moving image is larger than a change range of a contrast ratio of the still image.

15. The method according to claim 14, further comprising detecting, by the at least one processor, a change in the category of the displayed image, and
decreasing, by the at least one processor, the viewing fatigue level within a change range of a contrast ratio corresponding to the changed category.

16. The method according to claim 12, further comprising storing, by the at least one processor, a lookup table of setting values of color temperature and brightness of an image corresponding to an operation time of the viewer fatigue reduction function, and
wherein the controlling the image comprises loading, by the at least one processor, the color temperature and the brightness corresponding to the operation time of the viewer fatigue reduction function from the lookup table during the suitable time interval, and controlling, by the at least one processor, the display to apply the loaded color temperature and brightness to the displayed image.

17. The method according to claim 11, further comprising performing, by the at least one processor, an instant level decrease for immediately decreasing the viewing fatigue level of the displayed image by a first decrement in response to beginning the viewer fatigue reduction function,
wherein the controlling the image comprises performing, by the at least one processor, a gradual level decrease for gradually decreasing the viewing fatigue level by a second decrement during a predetermined time interval, after the instant level decrease, and decreasing the viewing fatigue level during the determined suitable time interval in accordance with an average picture level.

18. The method according to claim 11, further comprising terminating, by the at least one processor, the viewer fatigue reduction function for the viewing fatigue level in response to an attribute value of the displayed image reaching a target value or a preset operation time elapsing,
wherein the target value corresponds to a category of the displayed image.

19. A method of controlling a display apparatus, the method comprising:
receiving, by a user input interface, a user input for beginning a viewer fatigue reduction function;
detecting, by at least one processor, a motion vector of an image displayed on a display during a first time interval of an image signal in response to beginning the viewer fatigue reduction function;
determining, by the at least one processor, the first time interval as a suitable time interval for a viewer fatigue reduction function based on a regularity of the motion vector; and
controlling, by the at least one processor, the displayed image to decrease a viewing fatigue level of the displayed image.

* * * * *